(12) United States Patent
Nagai et al.

(10) Patent No.: US 9,064,108 B2
(45) Date of Patent: *Jun. 23, 2015

(54) STORAGE DEVICE, STORAGE SYSTEM, AND AUTHENTICATION METHOD

(71) Applicant: Kabushiki Kaisha Toshiba, Minato-ku (JP)

(72) Inventors: Koichi Nagai, Kanagawa (JP); Mitsunori Tadokoro, Kanagawa (JP); Teruji Yamakawa, Tokyo (JP); Kazuo Nakashima, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/301,542

(22) Filed: Jun. 11, 2014

(65) Prior Publication Data

US 2014/0298448 A1  Oct. 2, 2014

Related U.S. Application Data

(63) Continuation of application No. 13/408,430, filed on Feb. 29, 2012, now Pat. No. 8,782,804.

(30) Foreign Application Priority Data

Apr. 8, 2011  (JP) .................. 2011-086669

(51) Int. Cl.
  *G06F 7/04*  (2006.01)
  *G06F 21/44*  (2013.01)
  (Continued)

(52) U.S. Cl.
  CPC .............. *G06F 21/44* (2013.01); *G06F 21/79* (2013.01); *G06F 2221/2129* (2013.01);
  (Continued)

(58) Field of Classification Search
  USPC ........................................... 726/28
  See application file for complete search history.

(56) References Cited

U.S. PATENT DOCUMENTS 6,907,497 B2  6/2005  Hosono et al.
7,418,602 B2  8/2008  Yoshida et al.
(Continued)

FOREIGN PATENT DOCUMENTS

JP  8-306196  11/1996
JP  2003-249083  9/2003
(Continued)

OTHER PUBLICATIONS

"Toshiba Launches Wipe Technology in Self-Encrypting 2.5-Type Hard Disk Drives", http://www.toshiba.co.jp/about/press/2011_04/pr1301.htm (http://www.toshiba.co.jp/about/press/2011_04/pr_j1301.htm in Japanese), Press Release Apr. 13, 2011, 3 pages.

(Continued)

*Primary Examiner* — Nirav B Patel
*Assistant Examiner* — Mohammed Waliullah
(74) *Attorney, Agent, or Firm* — Oblon, McClelland, Maier & Neustadt, L.L.P.

(57) ABSTRACT

According to one embodiment, a storage device that has a nonvolatile semiconductor memory includes an authentication information storage unit that previously stores first apparatus authentication information to authenticate an authorized host device and first user authentication information to authenticate an authorized user. The storage device executes apparatus authentication on the basis of second apparatus authentication information received from a newly connected host device and the first apparatus authentication information in the authentication information storage unit and executes an invalidation process of user data stored in the nonvolatile semiconductor memory, when the apparatus authentication is failed.

10 Claims, 26 Drawing Sheets

(51) Int. Cl.
*G06F 21/79* (2013.01)
*G11B 20/00* (2006.01)

(52) U.S. Cl.
CPC ..... *G11B 20/00137* (2013.01); *G11B 20/0021* (2013.01); *G11B 20/00478* (2013.01); *G11B 20/00666* (2013.01); *G11B 20/00673* (2013.01); *G11B 20/00086* (2013.01)

(56) References Cited

U.S. PATENT DOCUMENTS

| | | | |
|---|---|---|---|
| 2004/0230819 A1 | 11/2004 | Takahashi | |
| 2008/0189772 A1* | 8/2008 | Sims et al. | 726/5 |
| 2008/0301817 A1* | 12/2008 | Yoshida et al. | 726/26 |
| 2009/0094245 A1* | 4/2009 | Kerns | 707/9 |
| 2009/0228642 A1 | 9/2009 | Yano et al. | |
| 2009/0276829 A1* | 11/2009 | Sela et al. | 726/2 |
| 2010/0241870 A1 | 9/2010 | Ito et al. | |
| 2010/0262765 A1 | 10/2010 | Cheon et al. | |
| 2011/0022850 A1* | 1/2011 | Lee et al. | 713/189 |
| 2011/0116496 A1 | 5/2011 | Maeng et al. | |
| 2012/0072645 A1 | 3/2012 | Kasai et al. | |

FOREIGN PATENT DOCUMENTS

| | | |
|---|---|---|
| JP | 2008-5408 | 1/2008 |
| JP | 2009-211228 | 9/2009 |
| JP | 2011-39975 | 2/2011 |

OTHER PUBLICATIONS

Japanese Office Action issued Jul. 1, 2014, in Japan Patent Application No. 2011-086669 (with English translation).

* cited by examiner

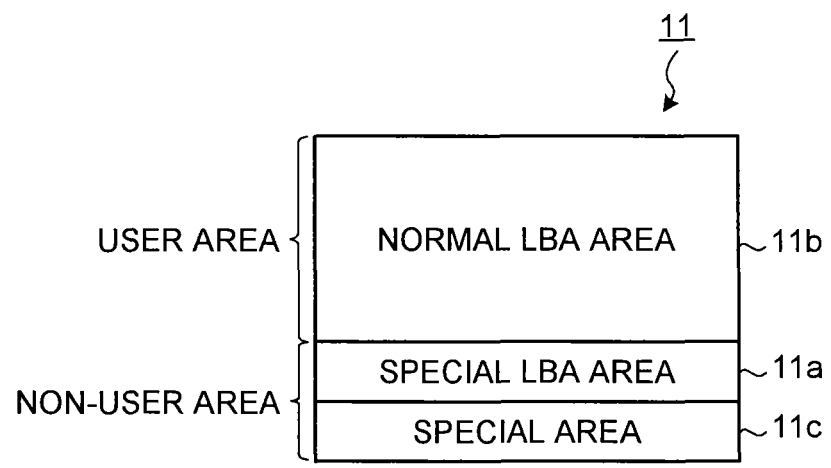

FIG.16

| FIRST APPARATUS AUTHENTICATION INFORMATION | INTERNAL INFORMATION G |
|---|---|
| FIRST FIRST APPARATUS AUTHENTICATION INFORMATION: VALUE OBTAINED BY CONVERTING UNIQUE INFORMATION OF FIRST AUTHORIZED HOST DEVICE 30A-1 WITH ONE-WAY FUNCTION | FIRST INTERNAL INFORMATION g-1: VALUE OBTAINED BY COMBINING UNIQUE INFORMATION OF FIRST AUTHORIZED HOST DEVICE 30A AND FIRST PORTION KEY |
| SECOND FIRST APPARATUS AUTHENTICATION INFORMATION: VALUE OBTAINED BY CONVERTING UNIQUE INFORMATION OF SECOND AUTHORIZED HOST DEVICE 30A-2 WITH ONE-WAY FUNCTION | SECOND INTERNAL INFORMATION g-2: VALUE OBTAINED BY COMBINING UNIQUE INFORMATION OF SECOND AUTHORIZED HOST DEVICE 30A AND FIRST PORTION KEY |
| ⋮ | ⋮ |
| n-TH FIRST APPARATUS AUTHENTICATION INFORMATION: VALUE OBTAINED BY CONVERTING UNIQUE INFORMATION OF n-TH AUTHORIZED HOST DEVICE 30A-n WITH ONE-WAY FUNCTION | n-TH INTERNAL INFORMATION g-n: VALUE OBTAINED BY COMBINING UNIQUE INFORMATION OF n-TH AUTHORIZED HOST DEVICE 30A-n AND FIRST PORTION KEY |

FIG.17

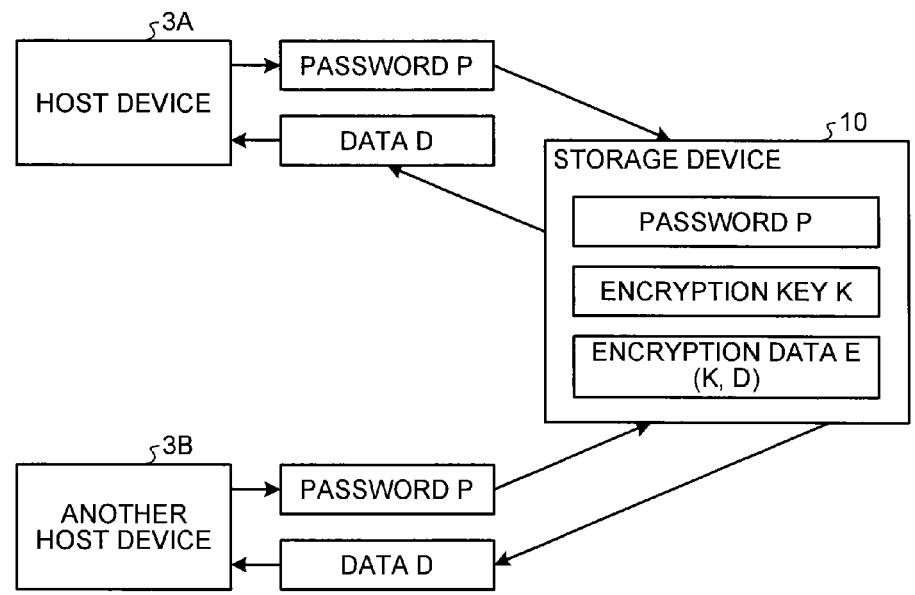

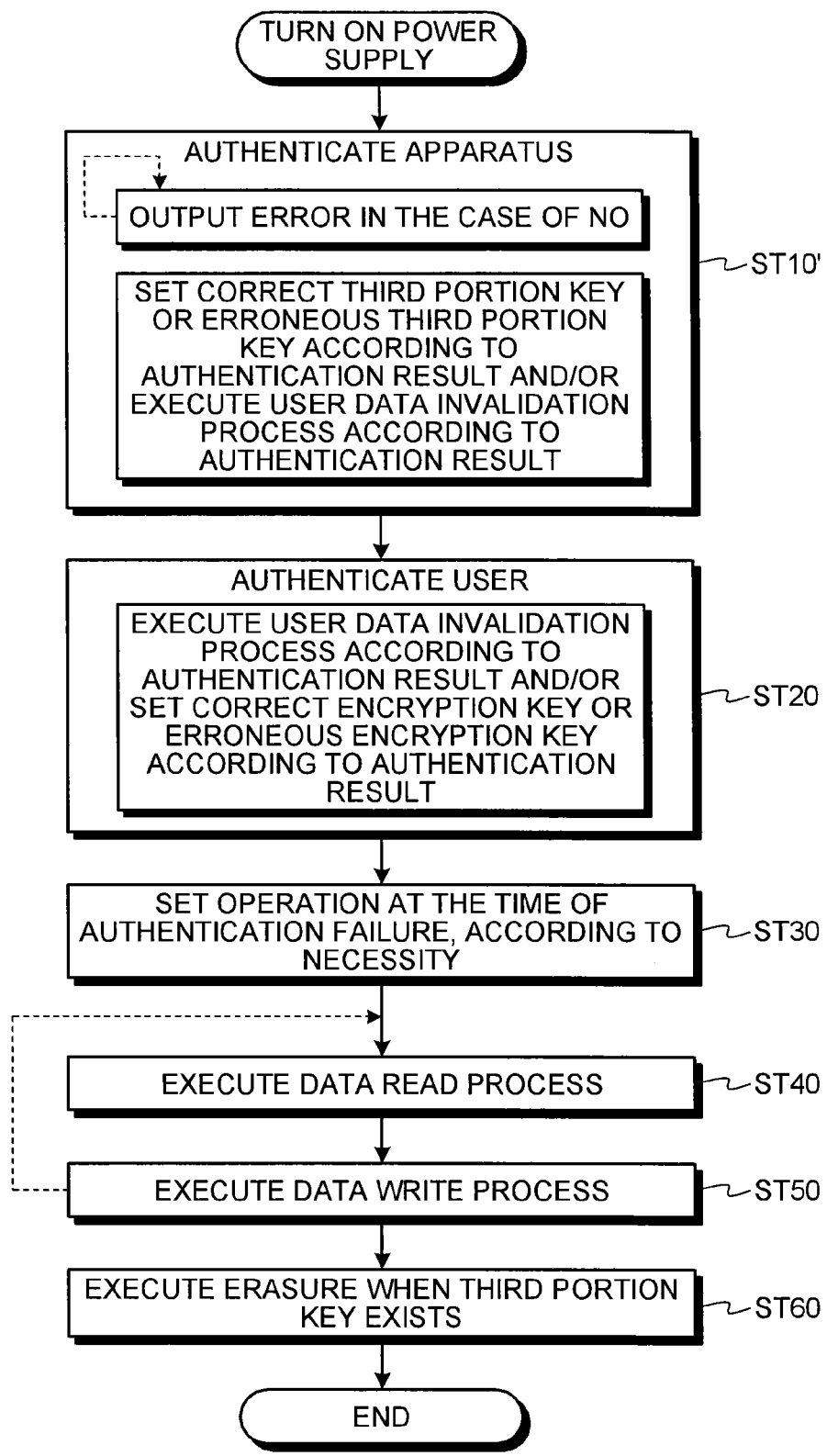

FIG.31

| 11 |
|---|
| SPECIAL AREA 11c: FIRMWARE |
| SPECIAL LBA AREA (SYSTEM AREA) 11a |
| FIRST PORTION KEY:<br>INTERNAL INFORMATION G OF STORAGE DEVICE 10 |
| FIRST APPARATUS AUTHENTICATION INFORMATION:<br>APPARATUS AUTHENTICATION INFORMATION OF AUTHORIZED HOST DEVICE 30A |
| FIRST USER AUTHENTICATION INFORMATION:<br>USER PASSWORD P AND USER ID |
| PERMITTED CONNECTION NUMBER OF TIMES:<br>NEW CONNECTION NUMBER OF TIMES PERMITTED UNTIL USER DATA INVALIDATION PROCESS |
| ERROR NUMBER OF TIMES:<br>NUMBER OF TIMES OF FAILING TO AUTHENTICATE APPARATUS |
| ADDRESS TRANSLATION INFORMATION |
| NORMAL LBA AREA 11b |
| USER DATA |

STORAGE DEVICE, STORAGE SYSTEM, AND AUTHENTICATION METHOD

CROSS-REFERENCE TO RELATED APPLICATIONS

This application is a continuation of and claims the benefit of priority under 35 U.S.C. §120 from U.S. Ser. No. 13/408,430 filed Feb. 29, 2012, and claims the benefit of priority under 35 U.S.C. §119 from Japanese Patent Application No. 2011-086669 filed Apr. 8, 2011; the entire contents of each of which are incorporated herein by reference.

FIELD

Embodiments described herein relate generally to a storage device, a storage system, and an authentication method.

BACKGROUND

In the related art, a solid state drive (SSD) (hereinafter, referred to as storage device) that has an authentication function and uses a NAND memory that is a nonvolatile semiconductor memory receives a data access request from a host device and outputs user data recorded in an area designated from the host device, when authentication of a password of a user who has access authority is succeeded. When the storage device has an encryption function, if the authentication of the password is succeeded, the storage device sets a previously stored encryption key as a decryption key and outputs user data obtained by decrypting encrypted user data by the decryption key. As such, the storage device according to the related art can output correct user data to the user who has access authority.

BRIEF DESCRIPTION OF THE DRAWINGS

FIG. 4 is a diagram illustrating a configuration example of address translation information;

FIG. 5 is a schematic diagram illustrating division of a storage area of a NAND memory;

FIG. 16 is a diagram illustrating an example of first apparatus authentication information and internal information in the case where the number of authorized host devices is plural;

FIG. 17 is a schematic diagram illustrating an operation of a storage system using a storage device that has a user data encryption function of executing only general password authentication;

FIG. 30 is a flowchart illustrating an operation in the fifth embodiment;

FIG. 31 is a schematic diagram illustrating data in a nonvolatile semiconductor memory in a sixth embodiment;

DETAILED DESCRIPTION

Figure 1:
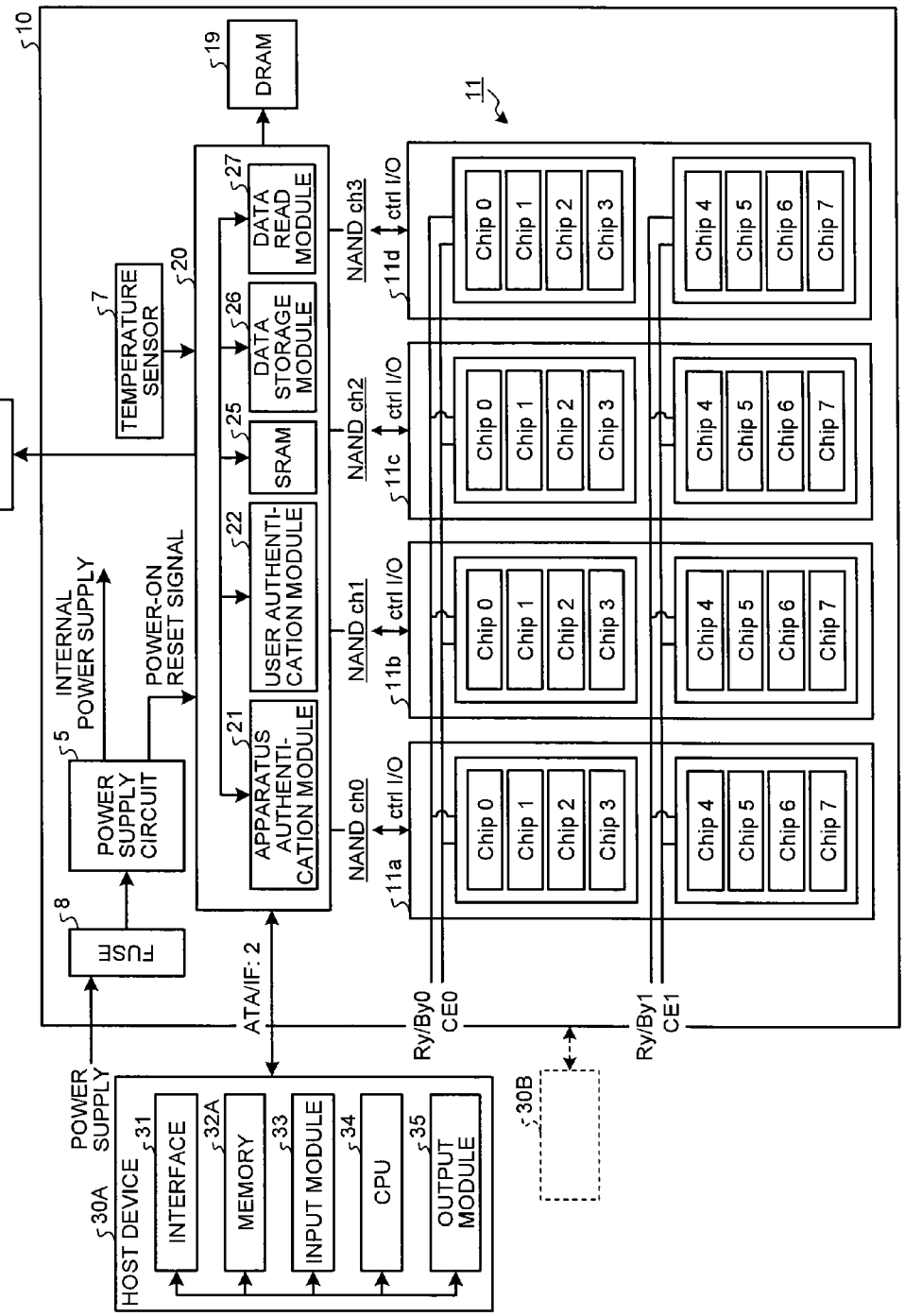
FIG. 1 is a block diagram illustrating a configuration example of a storage system according to a first embodiment.

In general, according to one embodiment, a storage device has a nonvolatile semiconductor memory to store user data and is connectable to arbitrary host devices. The storage device includes an authentication information storage unit that previously stores first apparatus authentication information to authenticate an authorized host device having connection authority, among the arbitrary host devices, and first user authentication information to authenticate an authorized user who uses the authorized host device. The storage device executes apparatus authentication on the basis of second apparatus authentication information received from a newly connected current host device and the first apparatus authentication information in the authentication information storage unit, and executes an invalidation process to make user data stored in the nonvolatile semiconductor memory not read, when the apparatus authentication is failed. The storage device executes user authentication on the basis of the second user authentication information received from the current host device and the first user authentication information in the authentication information storage unit, after the apparatus authentication. The storage device outputs the user data stored in the nonvolatile semiconductor memory to the current host device, on the basis of a read request received from the current host device, when the user authentication is succeeded.

In a state in which the storage device according to the related art stores the user data, when the storage device is carried out to an external system environment by a user having access authority, the decrypted user data may be leaked due to successful password authentication.

Since a small storage device can be easily carried out, theft is easy to occur. If a password is broken after the theft, the user data may be leaked. For this reason, the user data needs to be securely invalidated at the carrying-out destination in order to prevent the leakage of the user data at the time of the theft.

As such, when the storage device according to the related art is accessed from an environment different from an available system environment, the user data that is stored in the storage device needs to be invalidated, regardless of whether the user has access authority.

As a system that invalidates the user data, a system that overwrites all of data stored in the storage device with invalidation data is most known. However, since this system needs long time, overwriting may be noticed by malicious attackers who desire to read the data and the malicious attackers turn off a power supply, and attacks are additionally generated. For this reason, it is required to execute an invalidation process of the user data in a short time.

As a technology for invalidating the user data in a short time, a system called encryption erasure that encrypts data, records the encrypted data, destructs an encryption key to make it difficult to decrypt the data, and invalidates the data in fact is known. However, in this system, the processing speed of the storage device decreases. An encryption circuit needs to be incorporated to prevent the processing speed of the storage device from decreasing. For this reason, the device is complicated, a size thereof increases, and power consumption thereof increases. In addition, the encryption device is regulated by laws of a lot of nations and the storage device that has an encryption function cannot be used in a lot of nations. Therefore, handling is complicated to meet the laws and the regulations in a lot of nations.

The user data is invalidated at the time of destruction. However, long time is needed to overwrite all of the data in the storage device with the invalidation data.

Exemplary embodiments of a storage device, a storage system, and an authentication method will be explained below in detail with reference to the accompanying drawings. The invention is not limited to the following embodiments.

First Embodiment

FIG. 1 is a block diagram illustrating a configuration example of a storage system according to a first embodiment.

Figure 2:
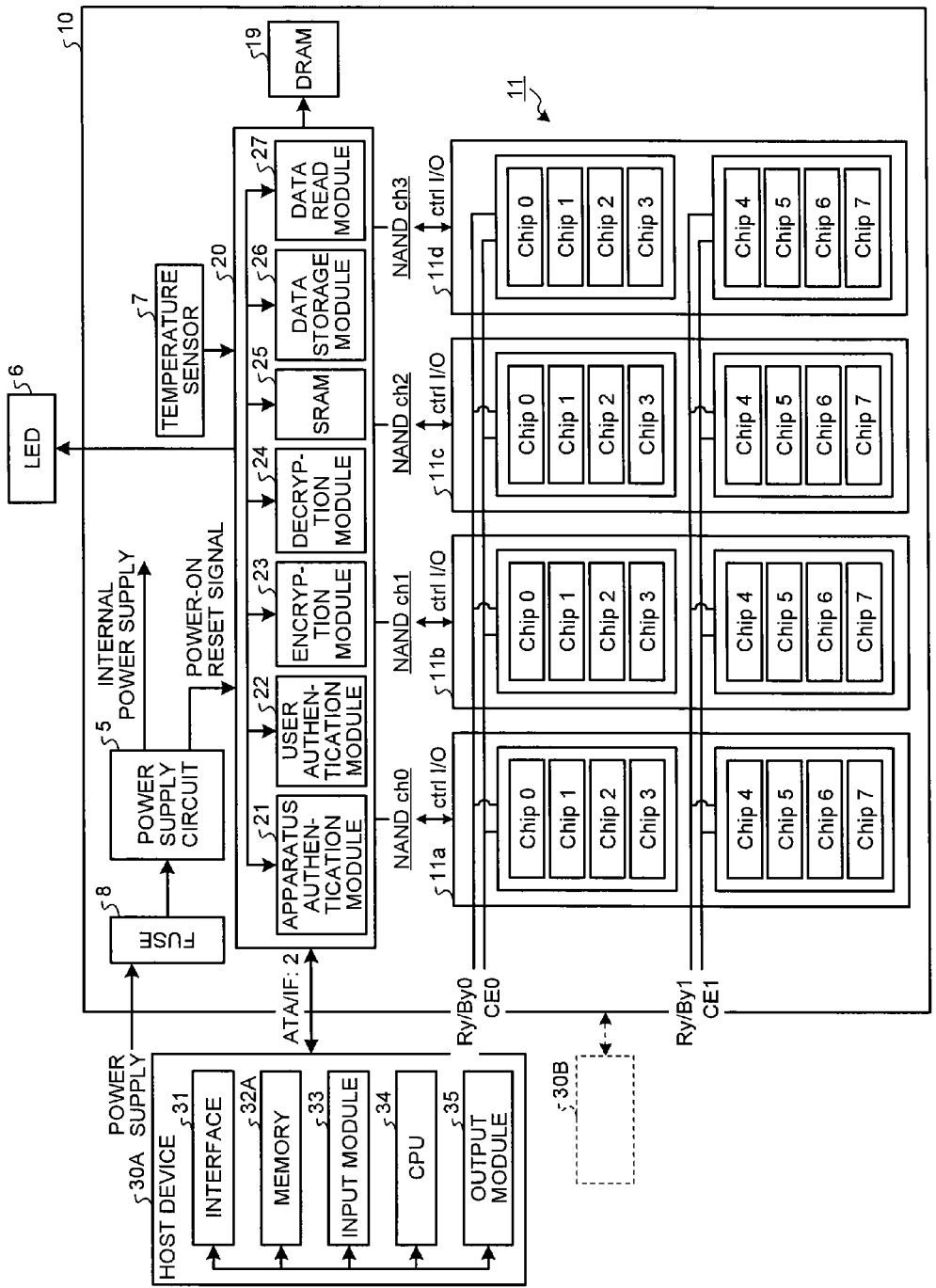
FIG. 2 is a block diagram illustrating a configuration example of the case where an encryption process of the storage system according to the first embodiment is executed.

FIG. 2 is a block diagram illustrating a configuration example of the case where an encryption process of the storage system according to the first embodiment is executed.

In a storage device, user data is encrypted and stored to protect stored data. As such, if an encryption process is executed, security is improved. However, the storage device needs to include an encryption module and a decryption module and a processing amount at the time of writing or reading increases. In this embodiment, an example (configuration example of FIG. 1) of the case where encryption is not executed will be mainly described. However, an example (configuration example of FIG. 2) of the case where the encryption process is not executed will be described together. In this embodiment, components that have the same reference numerals are components that have the same or similar functions.

As illustrated in FIG. 1, the storage system according to this embodiment has a volatile memory where data is erased when a power supply is turned off. The storage system includes a storage device 10 that is connectable to arbitrary host devices 30A, 30B, . . . to be attached/detached and the authorized host device 30A that has connection authority with respect to the storage device 10, among the arbitrary host devices 30A, 30B, . . . .

The storage device 10 includes a fuse 8, a power supply circuit 5, a temperature sensor 7, a nonvolatile semiconductor memory (NAND memory) 11 to be a storage medium, a dynamic random access memory (DRAM: buffer memory) 19, and a drive control circuit 20. The drive control circuit 20 includes an apparatus authentication module 21, a user authentication module 22, a static random access memory (SRAM: volatile memory) 25, a data storage module 26, and a data read module 27. In this case, the case where the nonvolatile semiconductor memory 11 is a NAND memory is described. However, the nonvolatile semiconductor memory 11 may be a nonvolatile semiconductor memory other than the NAND memory.

As illustrated in FIG. 2, when the storage device 10 has a function of executing an encryption process of user data, the drive control circuit 20 includes an encryption module 23 and a decryption module 24, in addition to the components of the drive control circuit 20 in the example of FIG. 1.

First, the components of the configuration example of FIG. 1 and a basic operation thereof will be described. In this embodiment, the NAND memory 11 is used as the nonvolatile semiconductor memory that is included by the storage device. As illustrated in FIGS. 1 and 2, the NAND memory 11 has four parallel operation elements 11a to 11d that execute four parallel operations and one parallel operation element has two NAND memory packages. Each NAND memory package is configured using plural stacked NAND memory chips (for example, one chip=2 GB).

In the example of FIG. 1, each NAND memory package is configured using four stacked NAND memory chips and the NAND memory 11 has a capacity of 64 GB. For example, when each NAND memory package is configured using eight stacked NAND memory chips, the NAND memory 11 has a capacity of 128 GB.

The DRAM 19 functions as a cache for data transmission between the host device 30A and the NAND memory 11 and a memory for a work area. Instead of the DRAM 19, a ferroelectric RAM (FeRAM) that is a nonvolatile memory and a magnetoresistive RAM (MRAM) may be used. The drive control circuit 20 controls data transmission through the DRAM 19 between the host device 30A and the NAND memory 20 and controls the components in the storage device 10. The drive control circuit 20 has a function of supplying a signal for status display to a light emitting diode (LED) 6 for status display, receiving a power-on reset signal from the power supply circuit, and supplying a reset signal and a clock signal to the individual units in a self circuit and the storage device 10. The LED 6 is not provided in the storage device 10 and only a terminal that outputs a signal to turn on the LED 6 provided in the host device may be provided.

Figure 3A:
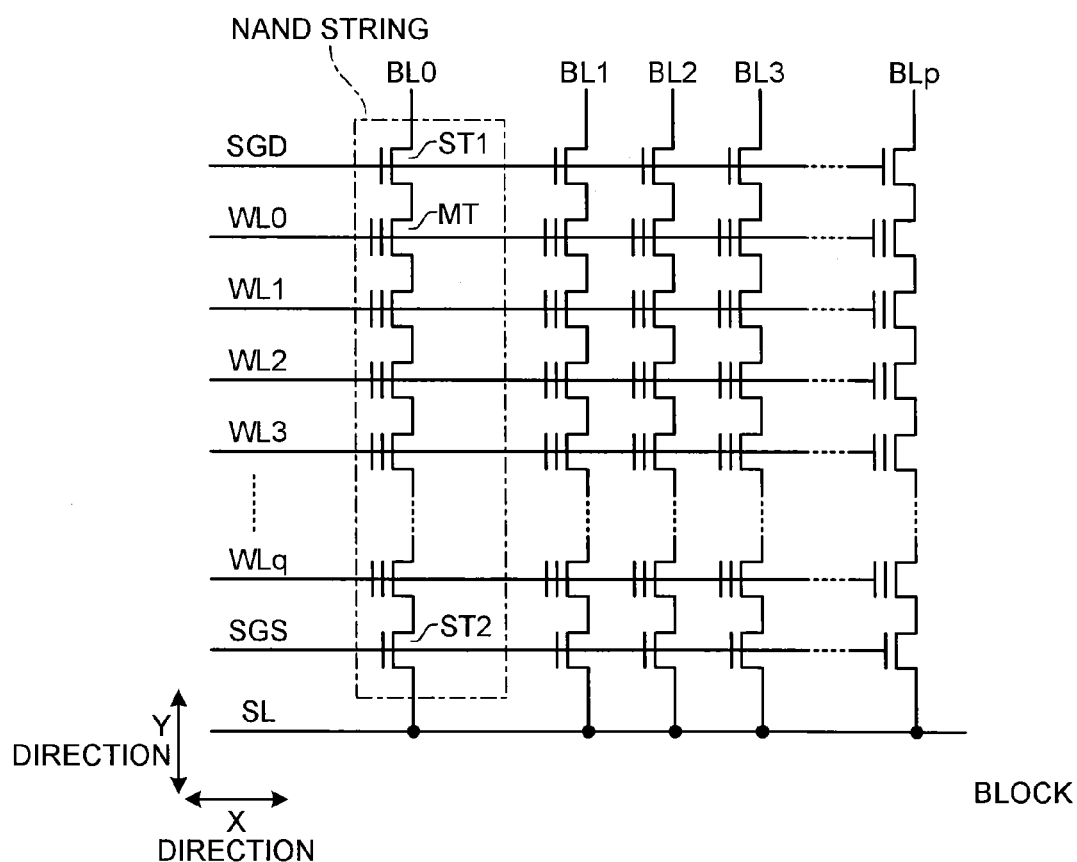
FIGS. 3A and 3B are diagrams illustrating a configuration example of one physical block that is included in a NAND memory chip.

Each NAND memory chip is configured by arranging plural physical blocks each becoming a unit of data erasure. FIG. 3A is a circuit diagram illustrating a configuration example of one physical block that is included in the NAND memory chip. Each physical block includes (p+1) NAND strings that are arranged sequentially along an X direction (p is an integer of 0 or more). In selection transistors ST1 that are included in the (p+1) NAND strings, respectively, drains thereof are connected to bit lines BL0 to BLp, respectively, and gates thereof are connected commonly to a selection gate line SGD. Sources of selection transistors ST2 are connected commonly to a source line SL and gates thereof are connected commonly to a selection gate line SGS.

Each memory cell transistor MT is configured using a metal oxide semiconductor field effect transistor (MOSFET) that has a stacked gate structure formed on a semiconductor substrate. The stacked gate structure includes a charge accumulating layer (floating gate electrode) that is formed on the semiconductor substrate with a gate insulating film interposed therebetween and a control gate electrode that is formed on the charge accumulating layer with an inter-gate insulating film interposed therebetween. In the memory cell transistor MT, a threshold voltage is changed according to the number of electrons accumulated in the floating gate electrode and data is stored according to the difference of the threshold voltages. The memory cell transistor MT may be configured to store one bit or may be configured to store multiple values (data of two bits or more).

The structure of the memory cell transistor MT is not limited to the structure having the floating gate electrode and may be a structure where the threshold value can be adjusted by trapping electrons into a nitride film interface functioning as the charge accumulating layer, such as a metal-oxide-nitride-oxide-silicon (MONOS) type. Similar to the memory cell transistor MT having the floating gate electrode, the memory cell transistor MT having the MONOS structure may be configured to store one bit or may be configured to store multiple values (data of two bits or more).

In each NAND string, the (q+1) memory cell transistors MT may be arranged such that current paths are connected in series between the sources of the selection transistors ST1 and the drains of the selection transistors ST2. That is, the plural memory cell transistors MT are connected in series in a Y direction, such that the adjacent memory cell transistors MT share a diffusion area (source area or drain area).

In addition, the control gate electrodes are connected to word lines WL0 to WLq, respectively, sequentially from the memory cell transistor MT closest to the side of the drain. Therefore, the drain of the memory cell transistor MT that is connected to the word line WL0 is connected to the source of the selection transistor ST1 and the source of the memory cell transistor MT that is connected to the word line WLq is connected to the drain of the selection transistor ST2.

The word lines WL0 to WLq are connected commonly to the control gate electrodes of the memory cell transistors MT between the NAND strings in the physical block. That is, the control gate electrodes of the memory cell transistors MT that exist on the same row in the block are connected to the same word line WL. The (p+1) memory cell transistors MT that are connected to the same word line WL are handled as one page (physical page) and data is written and read for each physical page.

The bit lines BL0 to BLp are connected commonly to the drains of the selection transistors ST1 between the blocks. That is, the NAND strings that exist on the same column in the plural blocks are connected to the same bit line BL.

Figure 3B:
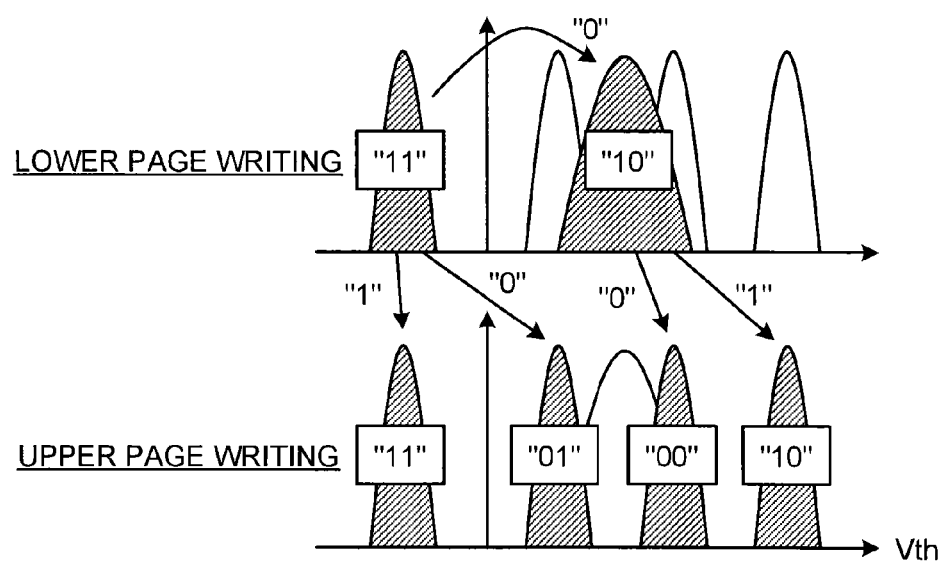

FIG. 3B is a schematic diagram illustrating a threshold value distribution in a four-valued data storage system that stores two bits in one memory cell transistor MT. In the four-valued data storage system, any one of four-valued data "xy" that is defined by upper page data "x" and lower page data "y" can be stored in the memory cell transistor MT.

To the four-valued data "xy", data "11", "01", "00", and "10" are allocated, in order of the threshold voltages of the memory cell transistors MT. The data "11" shows an erasure state in which the threshold voltage of the memory cell transistor MT is negative.

In a lower page writing operation, the data "10" is written selectively to the memory cell transistor MT where the data "11" is stored (erasure state), by writing of the lower bit data "y". The threshold value distribution of the data "10" before upper page writing is a middle threshold value distribution of the threshold value distribution of the data "01" and the threshold value distribution of the data "00" after the upper page writing and may be broader than the threshold value distribution after the upper page writing. In an upper page writing operation, writing of the upper bit data "x" is executed selectively to the memory cell having the data "11" and the memory cell having the data "10" and the data "01" and the data "00" are written.

The logical block addresses (LBA) and the physical addresses of the NAND memory 11 are managed by address translation information. FIG. 4 is a diagram illustrating a configuration example of the address translation information. At the time of reading user data requested from the host device 30A, the drive control circuit 20 acquires the physical address corresponding to the logical block address of the user data using the address translation information and reads the user data from the NAND memory 11. Herein, an example of the case of directly translating the logical block address and the physical address is described. However, the invention is not limited thereto and a system for translating the addresses in multiple steps (after the address is translated from the logical block address of the host device to the logical block address of the storage device, the address is translated into the physical address) may be used.

FIG. 5 is a schematic diagram illustrating division of the storage area of the NAND memory 11. As illustrated in FIG. 5, the storage area of the NAND memory 11 is divided into a normal LBA area 11b, a special LBA area 11a, and a special area 11c. In this case, the normal LBA area 11b is an LBA area (logical block address area) that can be accessed by a command (read command/write command) from the host device 30A, that is, a user data area. Meanwhile, the special LBA area 11a and the special area 11c are LBA areas that cannot be accessed by a normal command from the host device 30A.

An area of the NAND memory 11 with which the LBA is not associated is the special area 11c. In this embodiment, a non-user area includes the special LBA area (system area) 11a that is used in recording of management information and the special area 11c to which the other area where firmware is recorded or an area where the LBA including a free block FB is not allocated belongs. The special LBA area 11a and the special area 11c can be accessed by a command issued by a module constituting firmware (FW) developed in the storage device 10. The firmware is read at the time of the start, is developed on the SRAM 25, and is executed, by a code for firmware load called an initial program loader (IPL). The IPL is previously recorded in a read only memory (ROM) (not illustrated in the drawings) in the drive control device in the storage device 10. The special LBA area 11a, the normal LBA area 11b, and the special area 11c do not need to exist as physically continuous physical areas, and individual physical management units of the NAND memory 11 belong to these areas. For example, after a block used as the special area 11c is released and becomes the free block FB, if the user data is recorded in the free block FB, the corresponding block is used as the normal LBA area 11b. As such, the areas to which the individual physical management units belong are not fixed and change according to use of the storage device 10.

The normal LBA area 11b, the special area 11c, and the special LBA area (system area) 11a will be described using a special example. If a size (so-called disk capacity) of the area of the NAND memory 11 is set to 64 GB, the area of 64 GB is a user area. In this case, the area of 64 GB means that a range of the LBA is 64 GB and does not mean that the NAND memory 11 of 64 GB is allocated physically at all times. Meanwhile, in the NAND memory 11, in addition to the area (user area) of 64 GB that can be accessed from the host device 30A, as an area to store internal information of the NAND memory 11, an area (non-user area) having a predetermined size (for example, about one logical block) is mapped on the LBA. The area of 64 GB is the normal LBA area 11b and the area having the predetermined size is the special LBA area (system area) 11a, and the other area is the special area 11c. Herein, the firmware is recorded in the special area 11c. However, the firmware may be recorded in the special LBA area 11a.

The special LBA area (system area) 11a is used to store management data to manage the NAND memory 11 and SMART information. The management data that is stored in the special LBA area (system area) 11a is handled by the same management system as that of the user data stored in the normal LBA area 11b and can be allocated to all of the logical blocks where the normal LBA area 11b can be mapped. That is, except for the difference of the logical block addresses, the difference of the processes does not exist, from the viewpoint of the drive control circuit 20.

The configuration example (hereinafter, referred to as configuration example α) of FIG. 1 is described above. However, in a configuration example (hereinafter, referred to as configuration example β) of FIG. 2, functions and basic operations of components are the same as those of the configuration example α. In the description below, the configuration example α will be described, as long as a specific mention is not given (when "the case of the configuration example β" is not described). The functions and the operations of the individual units of the configuration example β are the same as those of the configuration example α, except for portions related to the encryption process and the decryption process, and the redundant description will not be repeated.

Next, authentication and key data according to this embodiment will be described. In this embodiment, before executing access from the host devices 30A, 30B, . . . to the storage device 10 (before executing reading from the storage device 10 and executing writing to the storage device 10), the apparatus authentication process and the user authentication process are executed. When the authentication is executed by both the apparatus authentication process and the user authentication process, the storage device 10 can be accessed. An apparatus authentication sequence and a user authentication sequence are not particularly limited and may be arbitrarily executed.

Figure 6:
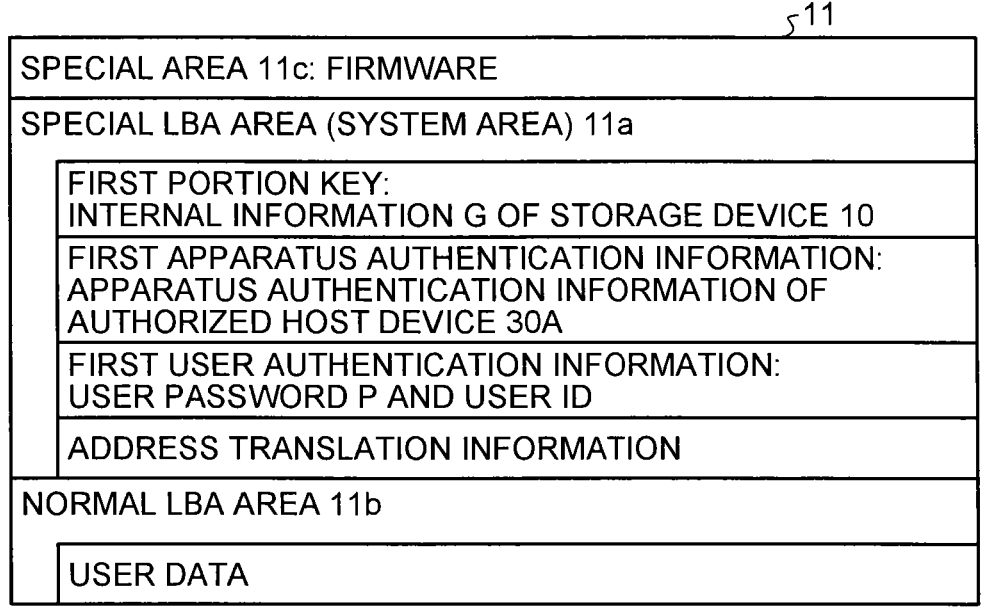
FIG. 6 is a diagram illustrating an example of data stored by a storage device and a storage area.

The storage device 10 according to this embodiment stores information to execute the apparatus authentication process and the user authentication process. FIG. 6 is a diagram illustrating an example of data stored by the storage device 10 and a storage area. As illustrated in FIG. 6, in this embodiment, a first portion key, first apparatus authentication information, first user authentication information, and address translation information are stored in the special LBA area (system area) 11a of the NAND memory 11. As such, the special LBA area (system area) 11a of the NAND memory 11 has a function as a first portion key storage unit that stores the first portion key and a function as an authentication information storage unit that stores the authentication information.

In the case of the configuration example α, the first portion key is key data that is used to generate an encryption key used to generate the first user authentication information. In the case of the configuration example α, the first portion key may not be used. In the case of the configuration example β, the first portion key is key data that is used to generate an encryption key written in the SRAM 25. As the first portion key, for example, internal information G of the storage device 10 is used. The internal information G is previously written in the system area 11a from the drive control circuit 20, at the time of initial setting. For example, in the case of the configuration example β, the internal information G is written in the system area 11a from the encryption module 23. In the case of the configuration example α (in the case of the configuration where the encryption module 23 is not provided), the internal information G may be written by a different module. In this case, as an example of the internal information G, a random number that is generated by a predetermined rule is used. However, the internal information G is not limited to this example. In the description below, the first portion key is described as the internal information G.

In this case, the example of the case where the first user authentication information is generated using the internal information G in the case of the configuration example α is described. However, the first user authentication information may not be generated using the internal information G. That is, the storage device 10 does not have the internal information G and the first user authentication information may be previously written in the system area 11a. Hereinafter, the case where the first user authentication information is generated using the internal information G in the configuration example α is described as a configuration example α1 and the case where the first user authentication information is not generated using the internal information G in the configuration example α is described as a configuration example α2. When the configuration example α1 and the configuration example α2 do not need to be distinguished (items common to both of them), the configuration example is described as the configuration example α. In the case of the configuration example α1, in the configuration example illustrated in FIG. 6, all or a part of the first user authentication information in the special LBA area (system area) 11a is stored as the internal information G in a form combined using a third encryption key (protected first user authentication information to be described below).

The first apparatus authentication information is information that is used to authenticate the normal host device 30A having connection authority, among the connectable arbitrary host devices 30A, 30B, . . . , and apparatus authentication information of an arbitrary apparatus authentication system can be used. For example, as the first apparatus authentication information, unique information "AA" of the host device 30A or a signature verification key Kveri-30A of the host device 30A can be used. However, the invention is not limited to this example. The first apparatus authentication information is previously written in the system area 11a from the apparatus authentication module 21, at the time of initial setting. As an apparatus authentication system, a system for collating the first apparatus authentication information and the second apparatus authentication information equal to each other or a system based on the first apparatus authentication information and the second apparatus authentication information different from each other to be described in second and third embodiments may be used. As the unique information of the host device 30A, for example, an MAC address can be used. However, the invention is not limited to this example.

The first user authentication information is information that is used to authenticate an authorized user who uses the authorized host device 30A. As the first user authentication information, a password P and a user ID of the authorized user are used. However, the invention is not limited to this example. The first user authentication information is previously written in the system area 11a from the user authentication module 22, at the time of initial setting.

The normal LBA area 11b (user area) stores the user data D. When the storage device 10 has a user data encryption function (case of the configuration example β), the user area 11b stores encryption data Eg (Kg, D) that is user data D encrypted by the encryption module 23 on the basis of the encryption key Kg. In this case, a small letter "g" of "G" is used as an additional character and the encryption data is displayed as "Eg" and "Kg", in the case of the internal information G. In the case of internal information I, a small letter "i" of "I" is used as an additional character and the encryption data is displayed as "Ei" and "Ki". In the case of the configuration example α, the user data D is data that is not encrypted.

Figure 7:
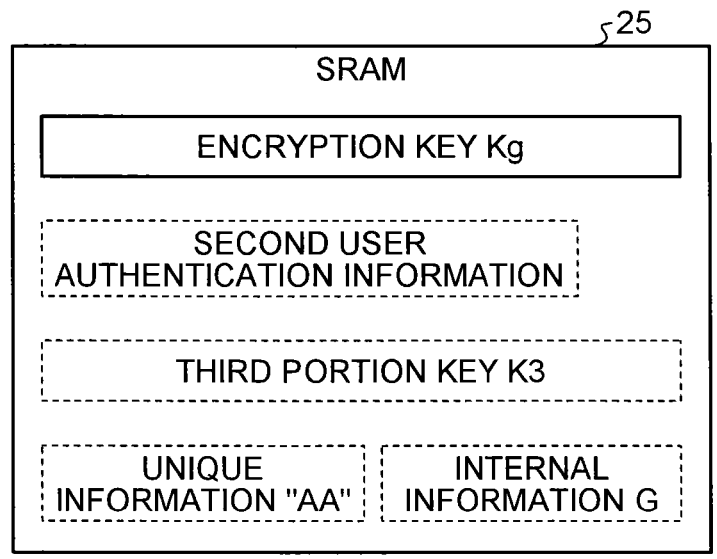
FIG. 7 is a diagram illustrating an example of data on an SRAM in the case where an encryption process is executed.

In the configuration example β, the encryption key Kg is stored in the SRAM 25, as illustrated in FIG. 7. FIG. 7 is a diagram illustrating an example of data on the SRAM 25 in the case where the encryption process is executed. If the encryption module 23 receives the user data of the write target from the host device 30A, the encryption module 23 encrypts the data using the encryption key Kg and generates the encryption data Eg (Kg, D) and the data storage module 26 writes the encryption data Eg (Kg, D) as the user data in the normal LBA area 11b. At the time of reading, the decryption module 24 decrypts the encryption data Eg (Kg, D) read by the data read module 27 from the normal LBA area 11b using the encryption key Kg and transmits the decrypted user data to the host device 30A.

The data storage module 26 has a function of recording data in the area on the NAND memory 11 where valid data is not stored. The data storage module 26 receives the logical block address and the user data transmitted from the host device, writes the user data in the area on the NAND memory 11 where the valid data is not stored, and writes a correspondence relationship of the physical address and the logical block address transmitted from the host device in address translation information in the special LBA area (system area) 11a. In the case of the configuration example β, before writing the user data in the NAND memory 11, the user data is converted into the encryption data Eg (Kg, D) by the encryption module 23, as described above.

The data read module 27 has a function of reading data of the designated logical block address from the NAND memory 11. When the data read module 27 is requested to output (read) the data of the designated logical block address from the host device 30A, the data read module 27 translates the logical block address into the physical address, on the basis of the address translation information stored in the system area 11a, reads the user data from the physical address on the NAND memory 11, and outputs the user data to the host device 30A. In the case of the configuration example β, as described above, after the encrypted user data is read, the encrypted user data is returned to user data of a plain text by the decryption module 24 and the user data is output to the host device 30A.

In the address translation information, the physical address corresponding to the logical block address is not registered in an initial stage. For this reason, if the data read module 27 receives a read request, the data read module 27 executes an operation for outputting data not written by the host device or notifying the host device of occurrence of an error.

As a system that realizes the above operation, for example, a next system is known. In the address translation information, the physical address corresponding to the logical block address is registered at the time of recording data on the NAND memory 11, in a state in which the physical address storing user data corresponding to the logical block address does not exist in the initial stage. When a physical address corresponding to the read data does not exist in the address translation information, the data read module 27 outputs data having only a zero value or notifies the host device of occurrence of the error.

The address translation information may be configured such that all of the logical block addresses thereof show the physical addresses of the special blocks storing one fixed data in the initial stage, and data that is obtained by reading the special blocks may be output to the host device, when a read request is transmitted from the host device.

The address translation process using the address translation information is not limited to the above example and any one of various realizing systems may be adopted. Even when an arbitrary realizing system is adopted, in a state in which the physical address storing the user data corresponding to the logical block address is not registered in the address translation information, even though the user data is stored in the NAND memory 11, the user data cannot be output by a request from the host device.

The DRAM 19 is a volatile memory, is controlled by the drive control circuit 20, and temporarily stores read data and write data. In addition, the DRAM 19 stores various management data used by the drive control circuit 20. The DRAM 19 may be used as a cache of the information recorded in the system area, particularly, the address translation information. Instead of the SRAM 25, the DRAM 19 may be used to store the data in the SRAM 25. Alternatively, in contrast, instead of the DRAM 19, the SRAM 25 may be used to store the data in the DRAM 19. However, when the nonvolatile FeRAM is used, instead of the DRAM 19 to be the volatile memory, the encryption key Kg is not erased at the time of turning off the power supply, as described below. Therefore, it is not preferable to store the encryption key Kg in the FeRAM.

The drive control circuit 20 is an interface that controls data transmission between the NAND memory 11 and the host device 30A, using the DRAM 19. The drive control circuit 20 controls a data read/write operation of the NAND memory 11 and controls the encryption process and the decryption process in the case of the configuration example β. In addition, the drive control circuit 20 controls the apparatus authentication process and the user authentication process. In this case, the user authentication process includes the process (for example, user data invalidation process at the time of authentication failure) other than the password authentication in the related art.

Hereinafter, functional blocks that are used for control of the apparatus authentication process, the user authentication process, the encryption process, and the decryption process, among the control of the drive control circuit 20 will be described.

The apparatus authentication module 21 has an apparatus authentication function of executing apparatus authentication on the basis of the second apparatus authentication information received from the newly connected current host device 30A (or 30B, . . . ) and the first apparatus authentication information in the special LBA area (system area) 11a and executing the user data invalidation process, when the apparatus authentication is failed. The second apparatus authentication information is information that forms a pair with the first apparatus authentication information in the apparatus authentication process, and the device side (in this case, the storage device 10) that executes the authentication acquires the second apparatus authentication information from the target apparatus and executes the apparatus authentication on the basis of the second apparatus authentication information and the stored first apparatus authentication information.

In the case of the configuration example α1 and the configuration example β (case of the storage device 10 to store the internal information G to be the first portion key), the apparatus authentication module 21 has a function of destructing the internal information G in the special LBA area (system area) 11a, when the apparatus authentication is failed.

In the case of the configuration example α1 and the configuration example β (case of the storage device 10 to store the internal information G to be the first portion key), the apparatus authentication module 21 has a function as a third portion key writing unit that combines the second portion key received from the authenticated host device 30A (or 30B, . . . ) and the internal information G (first portion key) in the system area 11a, after the apparatus authentication, and writes a generated third portion key K3 in the SRAM 25.

In this case, the combining means an operation for obtaining certain data on the basis of plural data and contents thereof are not particularly limited as long as a corresponding object can be achieved. For example, the internal information G may be information that is previously encrypted by the second portion key and the third portion key may be obtained by decrypting the internal information G using the second portion key (returning encrypted user data to user data of a plain text). Alternatively, the internal information G may be data that is stored with the second portion key and the third portion key and the combining process may be an operation for removing the second portion key from the internal information G and generating the third portion key. However, this is only exemplary and the combining process may be an arbitrary process as long as a predetermined relation can be defined between the second portion key, the internal information G, and the third portion key.

In this embodiment, the user data invalidation process is a process that makes the user data not read from the host device in order to protect the user data from the unauthorized host device. Hereinafter, a specific example of the user data invalidation process will be described.

First, a system that initializes the address translation information is considered as a first system of the user data invalidation process. The initialization is an operation for causing a state in which the physical address recording the user data corresponding to the logical block address cannot be obtained. For example, the entries of the address translation information that correspond to the addresses of all or a predetermined portion of the user data are deleted. In this case, since the magnitude of the address translation information is significantly smaller than the total data amount of the storage device 10, the user data can be invalidated in time significantly shorter than time needed in the case of actually deleting the user data. In addition, the physical address of the address translation information that corresponds to the user data of the invalidation target may be changed to the special physical address that corresponds to the area where the invalid data is stored.

When the address translation information is initialized (the entry is deleted), the drive control circuit 20 cannot read data from the NAND memory 11, if a mechanism (for example, a mechanism to designate a physical address and read data) to read data on the NAND memory 11 without using a logical block address is not additionally provided.

In this system, the data is recorded on the NAND memory 11. If the NAND memory 11 is disassembled, the data may be read directly from the nonvolatile semiconductor memory. According to a characteristic of the NAND memory, data is randomized and recorded, because the lifespan thereof increases. In the storage device 10 that includes a NAND memory miniaturized in recent years as the NAND memory 11, the data is randomized and recorded. As a randomizing system, a reversible conversion is used. However, a system using a pseudo random number (the random number does not need to be a random number in the cryptographic meaning that is used for a code) or a system using a cryptographic algorithm is known. When the cryptographic algorithm is used, because encryption is not an object, a fixed key or a key having the short length may be used. If the fixed key or the key having the short length is used, the code strength weakens, but the lifespan of the NAND memory 11 can be increased. Hardware for randomizing data can be realized by simple hardware, as compared with an encryption function to protect data. At any rate, in the storage device 10 that includes the NAND memory miniaturized in recent years, since the data can be randomized by hardware simpler than the hardware for randomizing the data to be used by the encryption drive, it is general to randomize the data and record the data in the NAND memory in order to increase the lifespan. Therefore, even though the NAND memory 11 is disassembled and the data is read directly from the NAND memory 11, the data cannot be immediately obtained in most of cases.

In actual mounting of the NAND memory 11, from circumstances of the management, the configuration of plural steps where a logical block address given from the outside is translated into an internal logical block address in the apparatus, is then translated into an internal logical block address, and is finally translated into a physical address can be taken. The operation for removing the address translation information described above may be executed at an arbitrary point of time, in the course of translating the logical block address given from the outside into the final physical address. As an example of the mounting, an address space of the NAND memory 11 may be divided into a user area and a non-user area, as illustrated in FIG. 5. In this case, by destructing only the address translation information corresponding to the user area, data access from the host device can be prohibited without losing information of the system area needed for the operation of the storage device 10.

As a second system of the user data invalidation process, a system that erases a recording area of the user data when the nonvolatile semiconductor memory 11 is a NAND memory is considered. In the NAND memory, overwriting cannot be executed, different from a hard disk drive using magnetic recording. Therefore, data is recorded after the data is erased in a unit of block. At this time, since time is needed to execute recording (writing), if only the erasure is executed, the erasure can be executed at a high speed.

Thereby, data that is actually recorded can be erased. For example, time of 200 ms is needed in erasure and recording of one block. However, in the case where only the erasure of one block is executed, the erasure can be executed in time of 5 ms or less, that is, time equal to or shorter than 1/40 of time needed in the case where the previous data is erased by executing overwriting with respect to the entire block.

In general, in the storage device using the NAND memory, a system that erases data when a block does not store valid data like when the block is removed from the address translation information in the normal recording operation, that is, when the block becomes a free block and a system that erases data immediately before recording, without erasing the data when the block becomes the free block are known.

In the erasure in the user data invalidation process according to this embodiment, all of the blocks where it is likely to record the user data may be actually erased, regardless of whether the block becomes the free block.

When the user data and the internal information of the storage device 10 are mixed and recorded in one block of the NAND memory 11, the data may be erased after the date other than the user data is copied into a different block.

The order of the erasure of the address translation information and the erasure of the block (erasure of the data on the actual block on the NAND memory 11) may be arbitrarily set. However, if the data of the corresponding block is erased without initializing (erasing) the address translation information, error correcting codes of data that is read by an encoding system become mismatched. Then, all of the error correcting codes becomes uncorrectable error (UNC). If this system is used, it becomes easy to confirm the target to be actually erased. After the confirmation of the erasure of the data, the address translation information may be erased again, on the basis of a request from the host device.

The NAND memory 11 is operated according to a command issued from the drive control circuit 20. In the case of the erasure, by transmitting an erasure command after the address of the erased block is transmitted from the drive control circuit 20 to the NAND memory 11, the erasure is executed in the NAND memory 11. In the description below, the operation in the NAND memory 11 will be descried. However, this means that the operation is executed in the NAND memory 11, on the basis of the command transmitted from the drive control circuit 20 and the physical block address.

As a third system of the user data invalidation process, a system that makes the erasure of the second system become incomplete erasure is considered. When the NAND memory is used as the nonvolatile memory 11, if the third system is used, the erasure based on the data invalidation can be incompletely executed at a high speed. The erasure of the data in the normal NAND memory is executed by a system that executes complete erasure until data can be recorded. When the data is erased in the NAND memory, the word lines WL0 to WLq of the block of the erasure target are selected, that is, the potential of the corresponding word line is set to 0 V, a predetermined voltage is applied to a P-Well to be an Si substrate for predetermined time, and electrons of a floating gate are extracted. Then, if confirmation (Erase Verify) of an erasure situation is executed and the data is incompletely erased, the data is completely erased by repeating an erasure operation several times (for example, refer to Patent Document 3).

However, if an object is to make the data not read from the NAND memory, the confirmation (Erase Verifying) of the erasure situation is not executed by executing the erasure operation once or erasure time can be reduced by reducing the number of times of executing the erasure operation. In this case, the data is incompletely erased. However, a value of each memory cell discretely changes and cannot be read in fact.

As such, the incomplete erasure in this case is insufficient as erasure to execute recording again. However, the incomplete erasure is sufficient erasure in the meaning that the data cannot be read. Since a sufficient erasure range becomes different according to the hardware configuration or various requests, one erasure operation may be insufficient. However, the erasure can be executed at an erasure speed higher than the erasure speed of the complete block erasure, by reducing the number of times of erasing as compared with the number of times of erasing in the complete block erasure.

Alternatively, variations are considered by adjustment such as setting one erasure time (application time of the erasure voltage) to time sufficient to make the data not read. By erasure work, the voltage is discretely decreased for each memory cell without equally decreasing the voltages of all of the memory cells. For this reason, even though the potential remains in the memory cells, it is very difficult to change a read level (voltage applied to the word lines at the time of reading) and reproduce data (restore the read data).

As such, if data is newly recorded in the block where the data is erased by the incomplete erasure, the data may change. For this reason, before newly recording the data, the normal erase operation needs to be executed again. In the case of the system for using the free block after the data is erased immediately before recording, execution of the incomplete erasure does not need to be memorized. In the case of the system for erasing the data when the block becomes the free block, the block where the data is incompletely erased is recorded as management information in the storage device 10. Then, the complete erasure needs to be executed with respect to the block.

As a fourth system of the user data invalidation process, a system that simultaneously erases plural blocks in a chip (NAND memory chip) to execute the erasure operation in the data invalidation process in the second and third erasure systems at a high speed is considered. This system is realized by using a command of the NAND memory to erase the plural designated blocks at one time, and can be realized by the system described in Japanese Patent Application Laid-open No. 8-306196. The system that simultaneously erases the plural blocks is not limited to the system described in the document. The fourth system is a system that selects all of the word lines in the corresponding block, applies the predetermined voltage to the P-Well to be the Si substrate for predetermined time, and extracts the electrons of the floating gate into the NAND memory 11. The fourth system becomes a modified version of the plural block simultaneous erasure system of the second system, if it is confirmed whether the block is completely erased and the erasure operation is executed again when the block is not completely erased and becomes a modified version of the plural block simultaneous incomplete erasure system of the third system, if the erasure operation is stopped before the block is completely erased.

As a fifth system of the user data invalidation process, a system that erases data in a unit of block by a one-time operation, if a problem does not occur even though the device is failed and does not function after the user data invalidation process in the storage device 10, when the NAND memory is used as the nonvolatile semiconductor memory 11, is considered. The fifth system is a system that selects all of the word lines in the chip of the erasure target, applies the voltage to the P-Well, and erases the entire chip. However, in this system, since power consumption may increase, a control operation needs to be executed such that each of the plural chips is erased, when the plural chips cannot be erased by collecting the plural chips.

In general, in the storage device using the NAND memory, firmware to be control program of drive and management information such as the address translation information used by the control program are recorded in the NAND memory. For this reason, if this system is used, all of the data is completely erased and the NAND memory does not operate as the storage device after the erasure.

As the invalidation system of the data of the entire chip, in addition to the erasure, overwriting may be executed by applying the recoding voltage in a direction where the potential of all of the memory cells increases. Specifically, the voltage of all of the bit lines may be set to 0 V and the program voltage may be applied to all of the word lines WL.

After the erasure, for example, a code for firmware load called an initial program loader (IPL) that is held in the drive control circuit detects error without discovering the firmware and shows non-existence of the firmware through the interface or using a signal of an LED for a notification of a drive access situation, and distinguishment with other failure from the outside can be made.

In this embodiment, in the user data invalidation process, it is preferable to use the system for erasing the portion of the user data, instead of the system for erasing all of the data (including an area where the firmware other than the user data is used) in the NAND memory 11. That is, the first to fourth systems are more preferable than the fifth system. When the system for erasing all of the data in the NAND memory 11 like the fifth system is used, the operation is stopped at the time of the invalidation process or an operation to be described below can be not executed in the middle of execution of the operation, even when the operation needs to be continuously executed.

In addition to the above systems, as the system of the user data invalidation process, various systems are considered. For example, a system that records information indicating execution of the user data invalidation process in the special LBA area (system area) 11a (hereinafter, referred to as system area 11a) and makes it impossible to respond to a read command from the host device, when the information is recorded is known. However, according to this system, since most of information remains on the nonvolatile semiconductor memory, defensive power for various attacks is weak. In this case, before a write command is received from the host device, at least the address translation information needs to be initialized. Or, the logical block address where the invalidation process is executed needs to be recorded. However, this process is complicated.

In addition, a system that overwrites meaningless data, for example, 0 with respect to the entire area on the NAND memory 11 where the user data is actually recorded is known. However, in the NAND memory where write time is long, because it takes time to execute the overwrite process, this system is not practical.

As described above, since the various systems are used in the user data invalidation process, the system to be used in the user data invalidation process may be set previously from the host. That is, in addition to various information in the embodiments described above and below, the identifier of the invalidation systems of the user data is stored in the system area 11a of the storage device 10. In this case, since various systems may be used together according to the erasure system, one or more systems may be stored.

The apparatus authentication module 21 has a setting function of setting (storing) information of the invalidation system of the user data to the system area 11a, when a setting request of the invalidation system of the user data is received from host device 30A, in addition to the functions described above.

For example, the apparatus authentication module 21 has a function of setting a combination of the initialization of the address translation information to be the first system and the incomplete erasure of the user data to be the third system, in addition to independent invalidation system setting such as setting of only initialization of the address translation information to be the first system, setting of only the complete erasure of the block storing the user data to be the second system, and setting of only the incomplete erasure of the block storing the user data to be the third system.

In order to realize the setting function, execution or non-execution may be set to each of the invalidation systems of the user data or a number may be given to each combination and the number may be stored. Alternatively, a level may be given according to the strength of the invalidation and setting may be made using the level. In addition, the apparatus authentication module 21 has a function of executing the user data invalidation process, on the basis of the invalidation system information stored in the system area 11a, when the user data invalidation process is executed. By the above configuration, the user data is invalidated using the invalidation system of the user data set by the host device.

In the case of the configuration example β, the destruction of the first portion key and the encryption key may be regarded as the system of the user data invalidation process and may be selected as the used system.

The user authentication module 22 has a user authentication function of executing user authentication, on the basis of the second user authentication information received from the host device 30A (or 30B, . . . ) and the first user authentication information in the system area 11a, after the apparatus authentication is executed by the apparatus authentication module 21.

In the case of the configuration example α1, the user authentication module 22 generates the protected first user authentication information by combining the third portion key and the first user authentication information and stores the protected first user authentication information as the internal information G in the system area 11a. At the time of the apparatus authentication, the user authentication module 22 combines the internal information G and the second portion key received from the host device 30A (or 30B, . . . ) to generate the third portion key K3, and stores the third portion key K3 in the SRAM 25. At the time of the user authentication, the user authentication module 22 generates the first user authentication information on the basis of the protected first user authentication information and the third portion key K3 and executes the user authentication on the basis of the generated first user authentication information and the second user authentication information received from the host device 30A (or 30B, . . . ). In this case, when the user authentication module 22 is connected to the unauthorized host device, the correct third portion key K3 is not obtained. Even when the correct second user information is transmitted from the host device, an effect of failing to execute the apparatus authentication is obtained. In this case, the protected user authentication information may be information that is obtained by protecting a portion of the first user authentication information. For example, if the first user authentication information is a user password and a user ID, only the user password may be protected.

In the case of the configuration example α2, the first user authentication information is previously stored in the system area 11a and the combining process using the internal information and the first user authentication information is not executed. The internal information G is also not included.

In the case of the configuration example β, the user authentication module 22 combines the internal information G and the second portion key received from the host device 30A (or 30B, . . . ) to generate the third portion key K3, and stores the third portion key K3 in the SRAM 25. After the user authentication, the user authentication module 22 combines the third portion key in the SRAM 25 and the second user authentication information received from the host device 30A (or 30B, . . . ) to generate the encryption key, and stores the generated encryption key in the SRAM 25.

In both the case of the configuration example α and the case of the configuration example β, when the user authentication is failed by the defined number of times, the user authentication module 22 may have a function of executing the user data invalidation process. In the case of the configuration example α1 and the case of the configuration example β, the user authentication module 22 may have a key destructing function of destructing the internal information G in the system area 11a and the third portion key in the SRAM 25 and the system area 11a. The user authentication module 22 may execute both the user data invalidation process and the key destruction. The user authentication module 22 may have an error output function of outputting user authentication error to the current host device 30A (or 30B, . . . ) without reading data from the NAND memory 11 and outputting the data to the host device 30A (or 30B, . . . ), when the user authentication is failed by the defined number of times, instead of the function of executing the user data invalidation process and the function of executing the key destructing process.

The encryption module 23 has an encryption function of encrypting data D in a write request on the basis of the encryption key Kg in the SRAM 25 and converting the data D into encryption data Eg (Kg, D), according to the write request including the data D received from the current host device 30A (or 30B, . . . ), at the time of writing the data by the data storage module 26, when the user authentication is succeeded.

The decryption module 24 has an encryption function of decrypting the encryption data in the user area 11b read according to a read request received from the current host device 30A (or 30B, . . . ) on the basis of the encryption key in the SRAM 25, at the time of reading the data by the data read module 27, when the user authentication is succeeded.

The SRAM 25 is a volatile memory where data can be read/written by each of the modules 21 to 24, 25, and 26. As illustrated in FIG. 7, in the case of the configuration example β, the unique information "AA" functioning as the second portion key and the internal information G functioning as the first portion key are temporarily stored before generating the third portion key K3. When the third portion key K3 is generated, the unique information "AA" and the internal information G are erased and the third portion key K3 is temporarily written. Likewise, when the encryption key Kg is generated, the second user authentication information for the combination is temporarily stored, the third portion key K3 and the second user authentication information are erased, and the encryption key Kg is written. In this case, "writing" means "setting". The encryption key Kg is erased from the SRAM 25, when a power supply of the storage device 10 is turned off. The temporary storage of the unique information "AA", the internal information G, the third portion key K3, and the second user authentication information and the storage of the encryption key Kg until the power supply is turned off may be executed by the DRAM 19, instead of the SRAM 25. The second portion key is not limited to the unique information "AA" of the host device 30A and arbitrary data that is managed by the authorized host device 30A may be used. The SRAM 25 may be used as a read cache of the address translation information.

In the case of the configuration example α1, the unique information "AA" functioning as the second portion key and the internal information G functioning as the first portion key are temporarily stored before generating the third portion key K3. When the third portion key K3 is generated, the unique information "AA" and the internal information G are erased and the third portion key K3 is temporarily written. The third portion key K3 is used when the first user authentication information is generated on the basis of the protected first user authentication information. After the first user authentication information is generated, the third portion key K3 is destructed.

Meanwhile, the host device 30A is a normal computer that can be used by a user having access authority and can connect the storage device 10.

Specifically, the host device 30A includes an interface 31, a memory 32A, an input module 33, a CPU 34, and an output module 35. The host device 30A and another host device 30B to be described below have almost the same configuration, except for the stored contents of the memory 32A. For this reason, among the components 31 to 35, a character "A" is added with respect to only the memory 32A.

The interface 31 is a module that is used to connect the storage device 10 to the host device 30A. In order to simplify the description, in the description below, the fact that data is transmitted between the storage device 10 and the host device through the interface 31 is not described.

Figure 8:
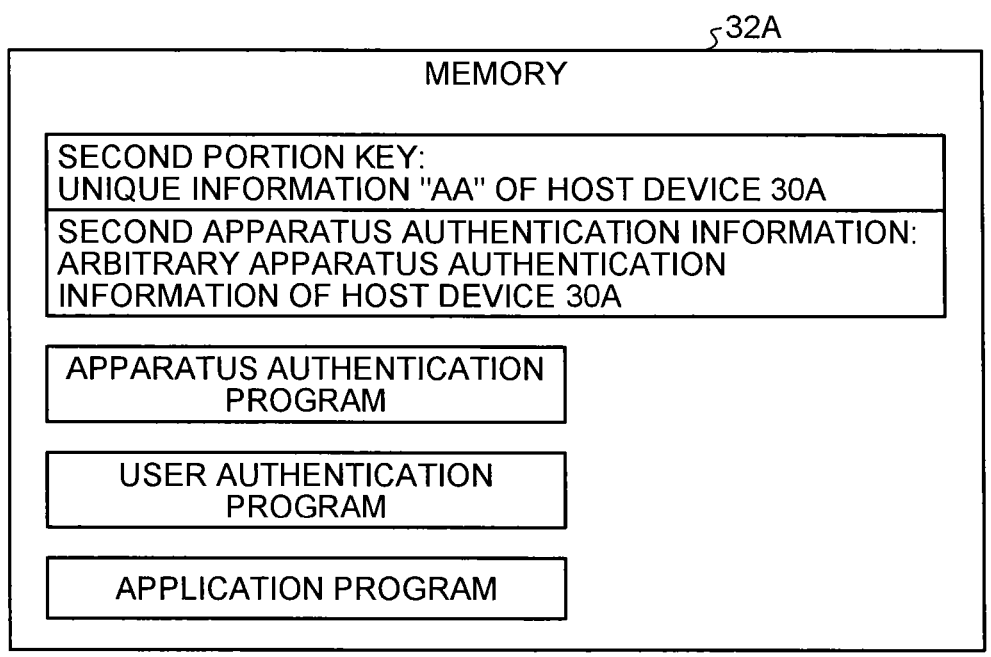
FIG. 8 is a diagram illustrating an example of data on a memory.

The memory 32A is a storage unit that can be read/written from the input module 33, the CPU 34, and the output module 35. For example, as illustrated in FIG. 8, the memory 32A stores a second portion key, second apparatus authentication information, an apparatus authentication program, a user authentication program, and an application program. In the memory 32A, data in the middle of the process and data of the process result are stored according to execution of each program.

The second portion key is key data that constitutes another portion of the encryption key generated by the storage device 10. As the second portion key, for example, the unique information "AA" of the self device (host device 30A) is used. However, the second portion key is not limited to this example. In the description below, the second portion key is described as the unique information "AA".

The second apparatus authentication information is information that is used to authenticate the authorized host device 30A having connection authority with respect to the storage device 10 in the storage device 10, and apparatus authentication information of an arbitrary apparatus authentication system can be used.

The apparatus authentication program is executed by the CPU 34 and operates the host device 30A as an apparatus authentication information transmitting unit that transmits the second apparatus authentication information in the memory 32A to the storage device 10, according to a predetermined authentication sequence of apparatus authentication executed by the apparatus authentication module 21 of the storage device 10, if the storage device 10 is connected to the host device 30A.

The user authentication program is executed by the CPU 34 and operates the host device 30A as a user authentication information transmitting unit that transmits the second user authentication information input by the input module 33 to the storage device 10.

The application program is an arbitrary program that is executed by the CPU 34. For example, the application program operates the host device 30A as a read request transmitting unit that transmits a read request input by the input module 33 to the storage device 10.

In addition, the application program may operate the host device 30A as a write request transmitting unit that transmits an input write request to the storage device 10.

The application program may operate the host device 30A as a read unit that reads data from the storage device 10 and a write unit that executes a work process on the basis of the read data and writes the process result in the storage device 10.

The input module 33 is an input interface with the user. For example, the input module 33 operates as a user authentication information receiving unit that receives an input of the second user authentication information according to an operation from the user and a read request receiving unit that receives an input of a read request according to an operation from the user. In addition, the input module 33 may operate as a write request receiving unit that receives an input of a write request including data according to an operation from the user. As the input module, for example, an input device such as a keyboard and a mouse may be appropriately used.

The CPU 34 is an operation processing device that executes each program in the memory 32A, on the basis of the data in the memory 32A.

The output module 35 is an output interface with the user. As the output module 35, for example, an output device such as a display device may be appropriately used.

Figure 9:
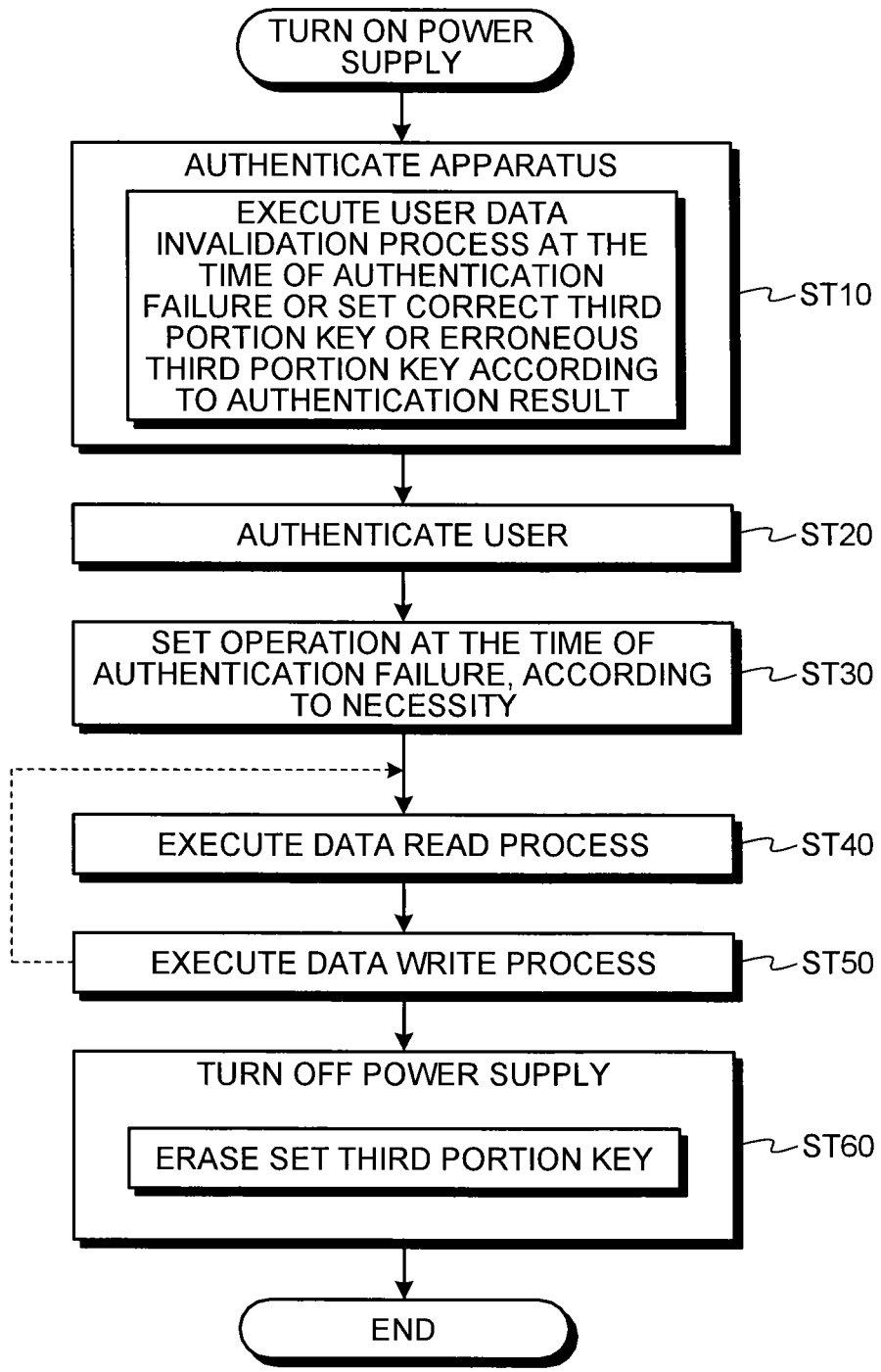
FIG. 9 is a flowchart illustrating an example of an operation of a configuration example α1 according to the first embodiment.
Figure 10:
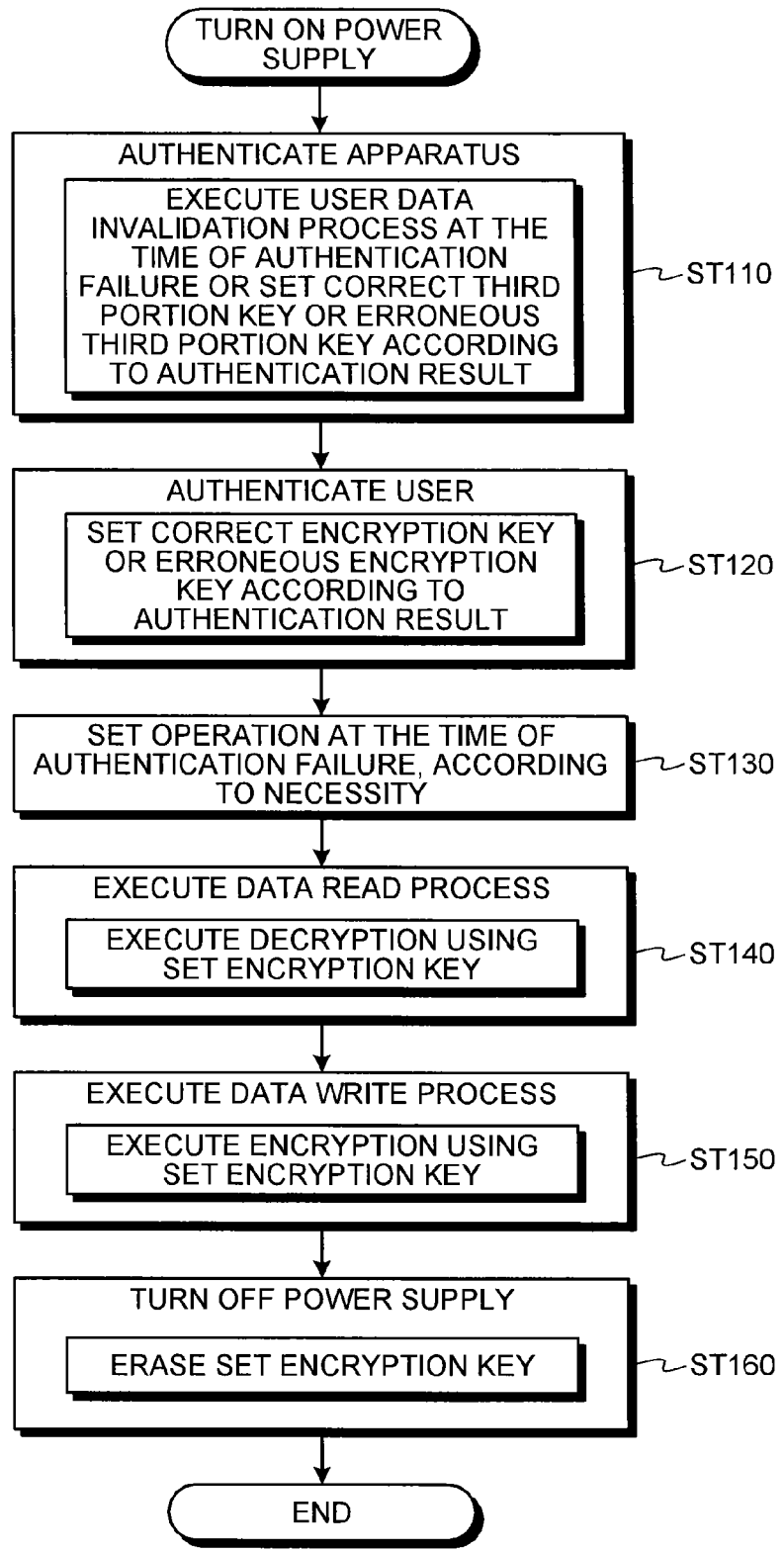
FIG. 10 is a flowchart illustrating an example of an operation of a configuration example β according to the first embodiment.
Figure 11:
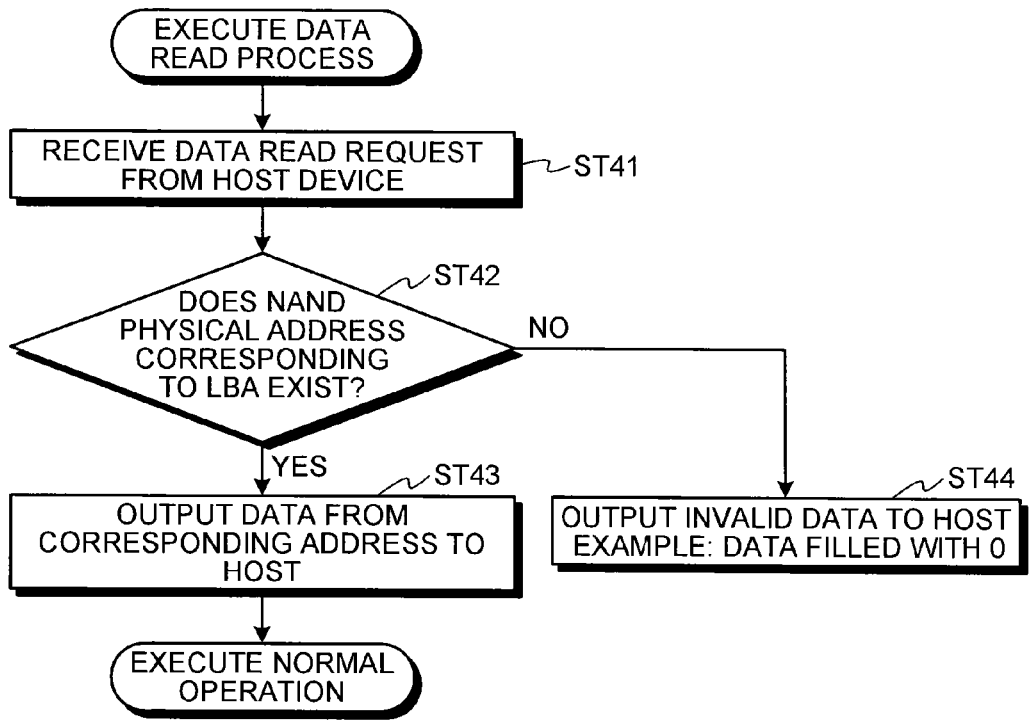
FIG. 11 is a flowchart illustrating an example of a detailed process sequence of step ST40.

Next, an operation of the storage system that has the above-described configuration will be described using flowcharts of FIGS. 9, 10, and 11. FIG. 9 illustrates an example of an operation of the case of the configuration example α1 and FIG. 10 illustrates an example of an operation of the case of the configuration example β. FIG. 11 is a flowchart illustrating an example of a detailed process sequence of step ST40 to be described below. In the case of the configuration example α2 (case where the internal information G is not stored), the process related to the third portion key is not executed in the process of FIG. 9. However, the other process is the same as the process of FIG. 9.

The storage device 10 stores the user data D in the NAND memory 11 in the case of the configuration example α and stores the encryption data Eg (Kg, D) in the NAND memory 11 in the case of the configuration example β. In the host device 30A, the apparatus authentication program, the user authentication program, and the application program in the memory 32A are executed by the CPU 34.

First, the operation of the case of the configuration example α will be described using FIG. 9. In this situation, the storage device 10 is connected to the authorized host device 30A by the authorized user and the power supply is turned on. Thereby, the storage device 10 executes apparatus authentication with respect to the host device 30A (step ST10).

Specifically, if the storage device 10 is connected to the host device 30A, the CPU 34 of the host device 30A transmits the second apparatus authentication information in the memory 32A to the storage device 10, according to the predetermined authentication sequence of the apparatus authentication.

The apparatus authentication module 21 of the storage device 10 executes the apparatus authentication, on the basis of the second apparatus authentication information received from the newly connected current host device 30A and the first apparatus authentication information in the system area 11a. When the apparatus authentication module 21 fails to execute the apparatus authentication, the apparatus authentication module 21 executes the user data invalidation process. In the case of the configuration example α1, when the apparatus authentication module 21 fails to execute the apparatus authentication, the apparatus authentication module 21 destructs the internal information G and sets internal information I (internal information I≠internal information G). In this case, it is assumed that the apparatus authentication is succeeded.

In the case of the configuration example α1, if the apparatus authentication is succeeded by the authentication process, the apparatus authentication module 21 combines the unique information "AA" received from the host device 30A and the internal information G in the system area 11a and writes the generated third portion key K3 in the SRAM 25. The third portion key K3 is a correct portion key. When the apparatus authentication is failed, an erroneous portion key K3i that includes the internal information I in the destruction state is written.

At any rate, in the case of the configuration example α1, that is, when the internal information G is used, the apparatus authentication of step ST10 is completed by writing of the third portion key.

Next, the storage device 10 executes user authentication with respect to the host device 30A (step ST20).

Specifically, the input module 33 of the host device 30A receives the input of the second user authentication information according to the operation from the user. The CPU 34 transmits the received second user authentication information to the storage device 10.

The user authentication module 22 of the storage device 10 executes the user authentication, on the basis of the second user authentication information received from the current host device 30A and the first user authentication information in the system area 11a. In this case, it is assumed that the user authentication is succeeded. When the first user authentication information is combined with the third portion key K3 and is stored as the protected first user authentication information in the system area 11a (the case of the configuration example α1), the user authentication module 22 generates the first user authentication information, on the basis of the third portion key K3 and the protected first user authentication information, and executes the authentication. When this system is adopted, if the apparatus authentication is failed, the erroneous third portion key K3i is generated and the erroneous first user authentication information is generated. For this reason, the user authentication is failed, even though the correct second user authentication information is transmitted from the host device.

When the user authentication is failed, the user data is invalidated by the invalidation process of the user authentication module 22.

In the case of the configuration example α1, the protected first user authentication information is obtained by encrypting the first user authentication information with the third portion key. Thereby, it becomes difficult to read the protected first user authentication information and security can be improved.

In this way, the user authentication of step ST20 is completed.

After the user authentication ends, the storage device 10 proceeds to steps ST30 to ST50, according to the operation of the host device 30A from the user. Herein, the case where the setting operation at the time of authentication failure in step ST30 is not executed and steps ST40 and ST50 are executed will be described.

The input module 33 of the host device 30A receives the input of the read request according to the operation from the user. The CPU 34 transmits the received read request to the storage device 10.

The data read module 27 of the storage device 10 outputs the data D in the NAND memory 11 read using the address translation information in the system area 11a to the current host device 30A, on the basis of the read request received from the current host device 30A (step ST40). In the data read process of step ST40, if the user data invalidation process is not executed, the correct data D is obtained. However, if the user data invalidation process is executed, the correct data is not output.

Next, the input module 33 of the host device 30A receives the input of the write request including the data D1, according to the operation from the user. The CPU 34 transmits the received write request to the storage device 10. The data storage module 26 of the storage device 10 writes data to the position of the user area 11b where valid data is not stored and writes a correspondence relationship of the logical block address transmitted from the host device and the actually data recorded physical position in the address translation information stored in the system area 11a, according to the write request including the data D1 received from the current host device 30A. In this way, step ST50 is completed.

Hereinafter, in the storage device 10, the read process of step ST40 and the write process of step ST50 are repetitively executed according to the operation of the host device 30A from the user.

Then, in the storage device 10, the power supply is turned off according to the operation from the user (step ST60). Thereby, in the storage device 10, the data in the DRAM 19 and the SRAM 25 is erased.

In this embodiment, as described above, each of the apparatus authentication module 21 and the user authentication module 22 has a function as the user data invalidating unit that executes the user data invalidation process. However, the invention is not limited to the above configuration. The user data invalidating unit may be provided separately from the apparatus authentication module 21 and the user authentication module 22, and the user data invalidating unit may execute the user data invalidation process, when the authentication is not made by the authentication process of the apparatus authentication module 21 and the user authentication module 22.

Next, an operation of the case of the configuration example β will be described using FIG. 10. Step ST110 is the same as step ST10 in the case of the configuration example α1. When the user is authenticated, the user authentication module 22 executes the user authentication process. After the user is authenticated, the user authentication module 22 combines the third portion key in the SRAM 25 and the second user authentication information and writes the generated encryption key in the SRAM 25 (step ST120). When the apparatus authentication module 21 fails to execute the apparatus authentication, the apparatus authentication module 21 destructs the internal information G and sets the internal information I (internal information I≠internal information G), similar to the case of the configuration example α1. When the user authentication module 22 fails to execute the user authentication, the user authentication module 22 writes the erroneous encryption key in the SRAM 25, similar to the case where the apparatus authentication is failed (step ST130).

Herein, the case where the user authentication is succeeded, step ST130 is not executed, and the process proceeds to steps ST140 and ST150 will be described. After the user is authenticated, the user authentication module 22 combines the third portion key in the SRAM 25 and the second user authentication information and writes the generated encryption key in the SRAM 25. When the user authentication module 22 receives the read request from the host device 50A, the user authentication module 22 reads the encryption data Eg (Kg, D) corresponding to the requested user data from the NAND memory 11 using the address translation information in the system area 11a, decrypts the read encryption data Eg (Kg, D) using the decryption module 24, on the basis of the encryption key Kg in the SRAM 25, obtains the decrypted data D, and outputs the data D to the current host device 30A (step ST140). In this way, step ST140 is completed.

In the data read process of step ST140, if the user data invalidation process is not executed, the correct data D is obtained. However, if the user data invalidation process is executed, the correct data is not output.

If the write request of the data D1 is received from the host device 50A, the data D1 of the write target is encrypted on the encryption key Kg in the SRAM 25, the encryption data Eg (Kg, D1) is generated, the same process as step ST50 is executed, and the data is written in the NAND memory 11 (step ST150). In this way, step ST150 is completed.

When the storage device 10 has the user data encryption function, even though the information given from the side of the host device is obtained, the storage device 10 is disassembled, the information is read directly from the nonvolatile memory, and various information can be known, the internal information G is destructed and only the internal information I remains. For this reason, the correct encryption key Kg cannot be obtained and the correct data D cannot be restored.

Hereinafter, in the storage device 10, the read process of step ST140 and the write process of step ST150 are repetitively executed according to the operation of the host device 30A from the user. Step ST160 is the same as step ST60.

As illustrated in FIG. 11, in the read processes of steps ST40 and ST140, if the data read request is received from the host device (host devices 30A, 30B, ... ) (step ST41), the drive control circuit 20 determines whether the physical address corresponding to the read requested data exists on the basis of the address translation information (step ST42). When the corresponding physical address exists (step ST42: Yes), the data is read from the corresponding physical address of the NAND memory 11 and the data is output to the host device (step ST43). When the corresponding physical address does not exist (step ST42: No), invalid data (data filled with 0) is output to the host device (step ST44).

As described above, according to this embodiment, the host apparatuses 30A, 30B, ... are authenticated, and when the apparatus authentication is failed, the data leakage of when the storage device is carried to the different system (when the storage device is connected to the unauthorized host device) can be prevented by the user data invalidation process. When the storage device has the encryption function, the encryption key is destructed by destruction of the internal information G (first portion key). Therefore, when the storage device is carried to the different system, the data leakage can be prevented from occurring due to disassembling of the storage device 10.

In the case of the configuration example β, when the apparatus authentication or the user authentication is failed, because the internal information G is rewritten, a correction encryption key that is needed for decryption is not obtained. Therefore, in the case of the configuration example β, when the apparatus authentication or the user authentication is failed, the user data invalidation process may be executed or may not be executed.

Even though the storage device 10 is connected to the authorized host device 30A again after the user data invalidation process is executed, because the invalidation process is executed, data cannot be read. Thereby, the data D can be securely destructed when the storage device 10 is stolen and the data leakage can be prevented.

When the user authentication is failed, the user data invalidation process is executed. In addition, when the storage device has the user data encryption function, the encryption key is also destructed. Therefore, the data D can be destructed before a password P of the user is analyzed, when the device is stolen.

By storing the encryption key in the SRAM 25 (volatile memory) when the power supply is turned on, the encryption key can be securely destructed when the power supply is turned off.

According to this embodiment, from the viewpoint of the host devices 30A, 30B, . . . the difference does not exist in handling methods (connection sequences) with the storage device 10, when the storage device 10 has the user data encryption function or when the storage device 10 does not have the user data encryption function. As the storage device that is connected to the host devices 30A, 30B, . . . , a hard disk drive (HDD) using a magnetic disk is mainly used at the present time. In the HDD, code erasure in an encryption drive is practical and the technology for invalidating the user data (operation in the configuration example α) described in this embodiment cannot be applied.

Meanwhile, if the configuration example α according to this embodiment is adopted in the storage device using the nonvolatile semiconductor memory, the operation of the host device is not changed, and an encryption drive can be used in the HDD and a drive that does not have an encryption function can be used in the case of using the storage device using the nonvolatile semiconductor memory. For this reason, the configuration of the side of the host device can be simplified and trouble such as switching of an operation in the case where the storage device is changed is not generated.

As for safety of the data, when information recorded in the nonvolatile semiconductor memory is actually erased by the user data invalidation process, even though the storage device does not have the encryption function of the user data, the safety is not deteriorated as compared with the case where the storage device has the encryption function of the user data. Even when only the address translation information is erased by the user data invalidation process, considerable effort is needed to restore the internal data. Therefore, information leakage can be prevented in many applications.

When the storage device has the user data encryption function (the case of the configuration example β), because the hardware that executes encryption and decryption is needed, the apparatus is complicated, the size thereof increases, and the power consumption thereof increases. Meanwhile, in the case of the configuration example α, since the storage device 10 that does not have the encryption hardware and can prevent the data leakage can be realized, the apparatus is simplified, the size thereof decreases, and the power consumption decreases.

Second Embodiment

Next, the second embodiment will be described with reference to FIGS. 1 and 2. A configuration example of a storage system according to this embodiment is the same as that of the first embodiment. In this embodiment, both a configuration example α where the storage device 10 does not have the encryption function as illustrated in FIG. 1 and a configuration example β where the storage device 10 has the encryption function as illustrated in FIG. 2 will be described. Similar to the first embodiment, the case where the process using the third portion key in the configuration example α is executed is set as a configuration example α1 and the case where the process not using the third portion key is executed is set as a configuration example α2.

Figure 12:
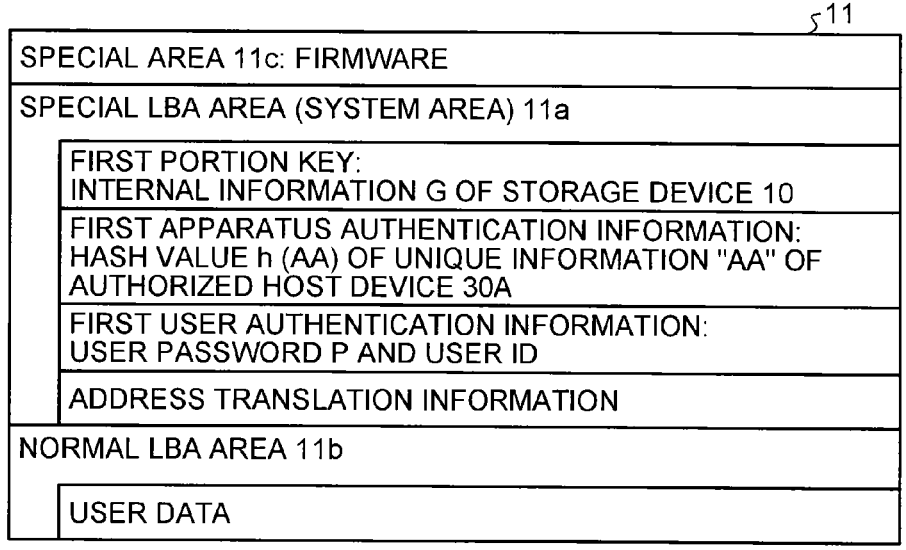
FIG. 12 is a schematic diagram illustrating data in a nonvolatile semiconductor memory in a second embodiment.

The second embodiment is a specific example of the first apparatus authentication information and the second apparatus authentication information in the first embodiment. That is, in this embodiment, the first apparatus authentication information is a hash value h (AA) of the unique information "AA" of the authorized host device 30A, as illustrated in FIG. 12.

Figure 13:
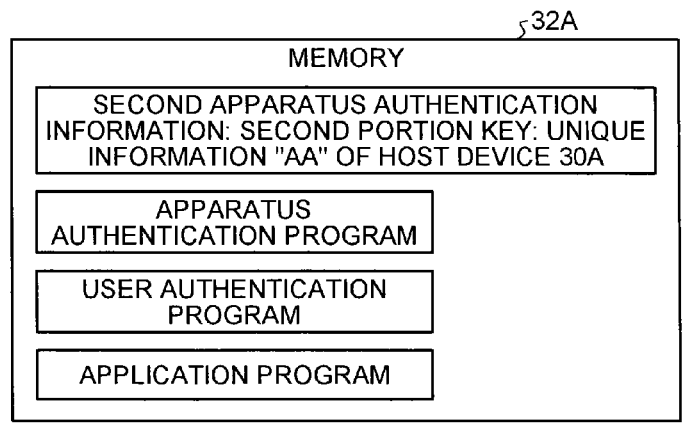
FIG. 13 is a schematic diagram illustrating data in a memory in the second embodiment.

The second apparatus authentication information is the unique information "AA" of the current host device 30A, as illustrated in FIG. 13. When the storage device 10 has the internal information G (the cases of the configuration examples α1 and β), the second apparatus authentication information is also used as the second portion key. The second portion key is the unique information "AA" of the current host device 30A that is used as the second apparatus authentication information.

By this configuration, the apparatus authentication module 21 of the storage device 10 has a function of calculating the hash value h (AA) of the second apparatus authentication information "AA" received from the current host device 30A and determining that the apparatus authentication is failed, when the has value h (AA) and the first apparatus authentication information h (AA) in the system area 11a are not matched as the collation result.

Figure 14:
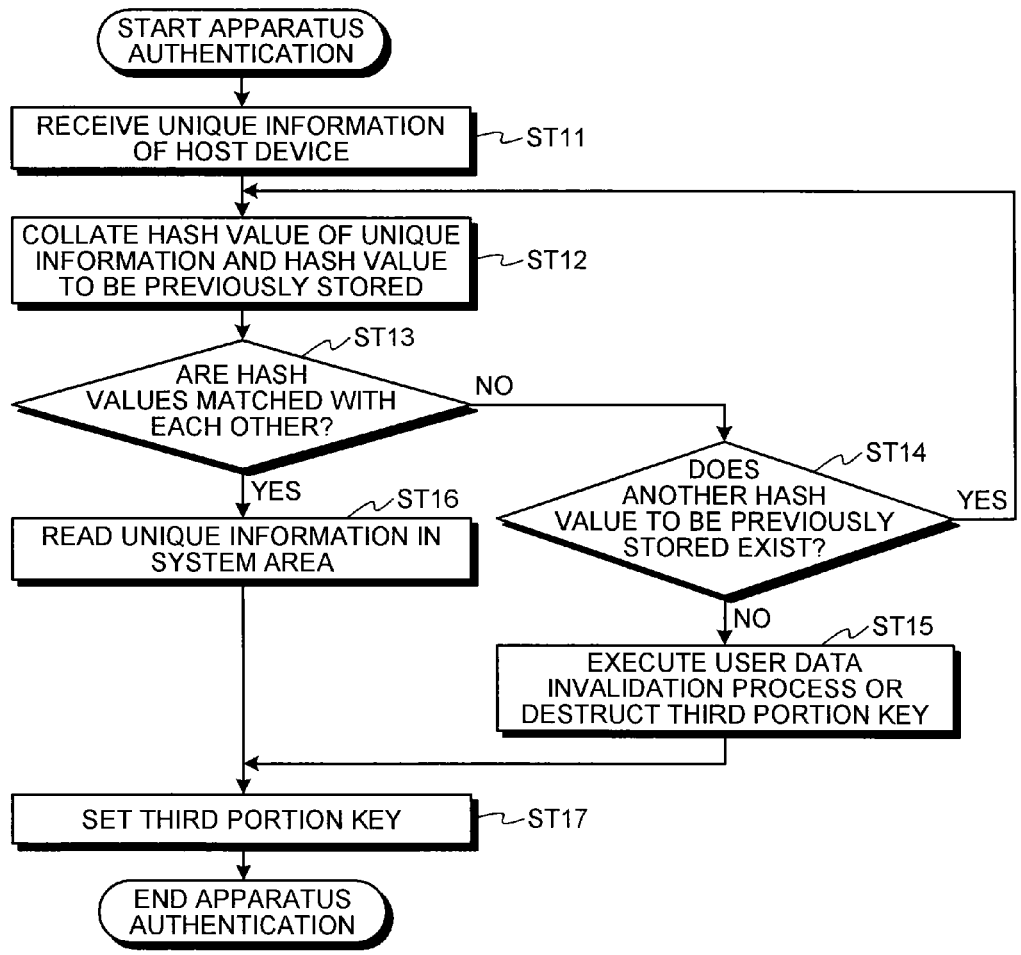
FIG. 14 is a flowchart illustrating an operation in the second embodiment.
Figure 15:
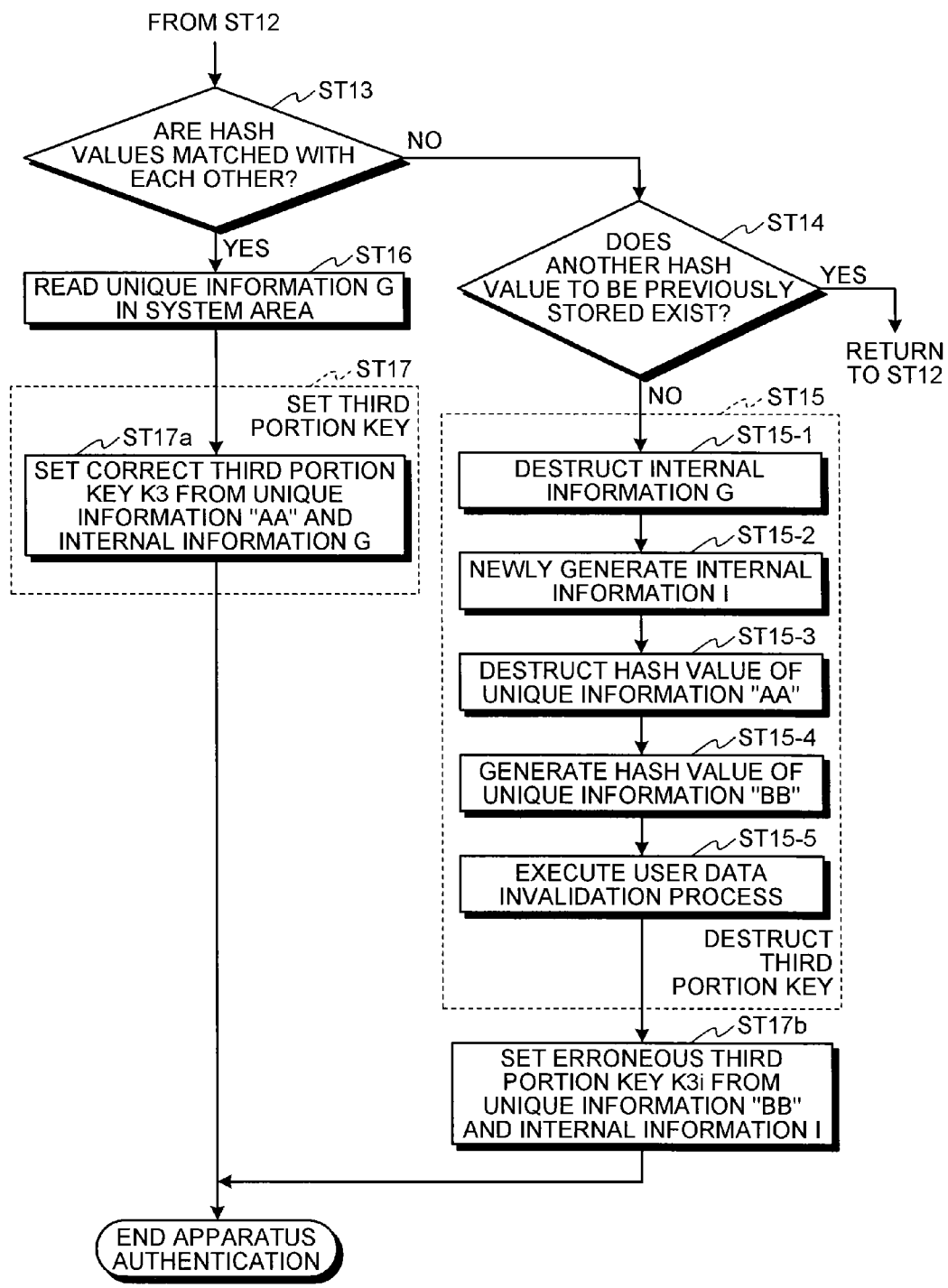
FIG. 15 is a flowchart illustrating an operation in the second embodiment.

Next, an operation of the storage system that has the above-described configuration will be described using flowcharts of FIGS. 14 and 15. FIG. 14 is a flowchart illustrating an example of an apparatus authentication sequence and FIG. 15 is a flowchart illustrating a detailed portion of the apparatus authentication sequence. In the case of the configuration example α2, the process related to the third portion key in FIG. 14 is not executed and the operation related to the internal information G and the third portion key in FIG. 15 is also not executed.

In the configuration example α or the configuration example β, the apparatus authentication of step ST10 or step ST110 starts.

If the storage device 10 is connected to the host device 30A, the CPU 34 of the host device 30A transmits the unique information "AA" in the memory 32A to the storage device 10, according to a predetermined authentication sequence of the apparatus authentication.

The apparatus authentication module 21 of the storage device 10 receives the unique information "AA" of the newly connected current host device 30A (step ST11). When the unauthorized host device 30B is connected to the storage device 10, the apparatus authentication module 21 receives unique information "BB" ("AA"≠"BB").

The apparatus authentication module 21 calculates the hash value h (AA) of the received unique information "AA", collates the hash value h (AA) and the hash value h (AA) of the unique information "AA" in the system area 11a (step ST12), and determines whether the hash values are matched (step ST13).

When the determination result of step ST13 is No (step ST13: No), the apparatus authentication module 21 determines whether another hash value previously stored in the system area 11a exists (step ST14). When another hash value exists (step ST14: Yes), the process returns to step ST12, such that a collation process is executed again using another hash value. The process of step ST14 is a process of when the number of connectable authorized host devices 30A . . . is plural and the plural host devices store different unique information, respectively. Therefore, step ST14 can be skipped when only one authorized host device 30A exists.

When the number of authorized host devices 30A is plural, the unique information "AA" is used as the second apparatus authentication information. For this reason, if the internal information G is configured to include information for each unique information "AA" of the authorized host devices 30A, the same third portion key can be generated, regardless of the kinds of authorized host devices 30A.

Hereinafter, an example of an operation of the case where the number of authorized host devices 30A is plural will be described using FIG. 16. FIG. 16 is a diagram illustrating an example of the first apparatus authentication information and the internal information in the case where the number of authorized host devices 30A is plural. In this case, the plural host devices 30A are assumed as a host device 30A-1, a host device 30A-2, a host device 30A-3, . . . , and a host device 30A-n. In addition, internal information g-j (j=1, 2, . . . , and n) after a combination is generated as a value obtained by combining unique information of the host device 30A-j and a first portion key (internal information G). Specifically, the internal information G is encrypted with unique information "AA-j" of the authorized host device 30A-j to generate the encryption internal information (internal information after the combination) g-j, and the encryption internal information g-j and a hash value h(AA-j) (first apparatus authentication information) of the unique information "AA-j" of the host device are associated with each other and are previously stored in the system area 11a. Herein, the example of the case where the first authentication information is the hash value of the unique information of the host device is described. However, the first authentication information is not limited thereto and may be a value that is obtained by converting the unique information of the host device with a one-way function.

When the apparatus is authenticated, encryption internal information g-k (k is any one of 1, 2, . . . , and n) that is associated with the first apparatus authentication information (hash value h(AA)) stored as a value matched with the hash value h(AA) of the received unique information "AA" and is stored is extracted. The encryption internal information g-k is converted into a plain text using "AA" to obtain the internal information G, and the internal information G is used as the third portion key.

That is, the previously stored internal information is set to a value converted by an existing function F1 of an inverse function using the unique information of the authorized host device, and the converted value and the unique information of the host device converted with a one-way function F2 are associated with each other and are stored. When the apparatus is authenticated, the received unique information of the host device is converted with the one-way function F2 and the stored information is compared with the unique information of the host device converted with the one-way function F2. If the same information is discovered, it is determined that the authentication is succeeded. Then, the unique information of the host device and the internal information g-j converted with the function F1 to be associated with each other are returned to the original internal information G by the inversion function of the function F1 and the unique information of the host device. The process by the function F1 is, for example, encryption and the process by the inverse function F1 is decryption. The one-way function F2 is, for example, a hash function.

In the above method, when information of the authorized host device is added, the non-combined first portion key needs to be stored in the storage device 10. Therefore, when the information of the authorized host device is added, the authorized host device (for example, host device 30A-1) that is already registered in the storage device 10 previously obtains unique information of the authorized n-th host device 30A-n to be added. After the authorized host device 30A-1 completes the authentication with the storage device 10, the authorized host device 30A-1 transmits an addition command of authentication information and the unique information of the host device 30A-n to the storage device 10. Then, the storage device 10 stores a value that is obtained by combining the first portion key generated when the currently connected host device 30A-1 is authenticated and the unique information of the host device 30A-n to be added, as the internal information (internal information after the combination). In addition, the storage device 10 associates the internal information after the combination and the value obtained by converting the unique information of the host device 30A-n to be added with the one-way function and stores the association result. Thereby, the authorized host device can be added. The above method is one embodiment and the invention is not limited thereto.

When the different third portion key is obtained according to the host device without adopting the above method, the storage device 10 correctly outputs only data that is recorded by the connected host device.

When the determination result of step ST14 is No (step S14: No), the apparatus authentication module 21 executes the user data invalidation process. In the cases of the configuration examples α1 and β, the third portion key is also destructed (step ST15). Specifically, as illustrated in FIG. 15, the apparatus authentication module 21 destructs the valid internal information G in the system area 11a (step ST15-1) and newly generates internal information I such as a random number and stores the internal information I, instead of the internal information G (step ST15-2). The apparatus authentication module 21 destructs the hash value of the unique information "AA" in the system area 11a (step ST15-3) and generates a hash value of unique information "BB" received in step ST11 (step ST15-4). In the case of the configuration example α, the apparatus authentication module 21 executes the user data invalidation process (step ST15-5). The user data invalidation process is not executed after step ST15-4 and may be executed immediately after any one of steps ST14, ST15-1, ST15-2, and ST15-3.

In steps ST15-1 and ST15-2, the internal information G that constitutes the third portion key K3 is destructed, the internal information I is newly generated, and the third portion key K3 is destructed. As the third portion key K3 is destructed, the encryption key Kg based on the third portion key K3 is destructed.

In the case where the internal information after the combination and the conversion value (for example, hash value) of the unique information "AA" by the one-way function are stored for each authorized host device such that the same third portion key is obtained even though the storage device is connected to the different authorized host device, the same destruction process is executed with respect to all of the internal information after the combination and the conversion values of the unique information "AA" by the one-way function.

Meanwhile, when the determination result of step ST13 is Yes (step ST13: Yes), the apparatus authentication module 21 reads the internal information G (or the internal information g-i after the combination) in the system area 11a (step ST16).

Then, the apparatus authentication module 21 combines the unique information "AA" received in step ST11 and the internal information G read in step ST16 (step ST117) and writes the generated correct third portion key K3 in the SRAM 25 (step ST17a).

When the third portion key K3 is destructed in step ST15, the apparatus authentication module 21 combines the unique information "BB" received in step ST11 and the internal information I generated in step ST15-2 and writes a generated erroneous third portion key K3i in the SRAM 25 (step ST17b).

At any rate, in the cases of the configuration examples α1 and β, the apparatus authentication of step ST10 is completed by writing of the third portion key.

Hereinafter, similar to the first embodiment, steps ST20 to ST60 (or steps ST120 to ST160) are executed.

Next, the case where the authorized host device 30A is connected to the storage device during the operation according to the second embodiment and the case where the unauthorized host device 30B is connected to the storage device during the operation will be complementarily described. First, the case of general password authentication will be simply described.

FIG. 17 is a schematic diagram illustrating an operation of a storage system using a storage device that has a user data encryption function of executing only general password authentication.

In the storage device 10, a password P of a user, an encryption key K, and encryption data E (K, D) that is obtained by encrypting data D with the encryption key K are stored.

In the storage device 10, if the correct password P is transmitted from both the authorized host device 30A and the unauthorized host device 30B, the encryption data E (K, D) is decrypted on the basis of the encryption key K and the correct data D can be output.

For this reason, a malicious user who has access authority may detach the storage device 10 from the authorized host device 30A, connect the storage device 10 to the host device 30B in the home, and correctly obtain the data D including confidential information.

The case where the storage device having the user data encryption function is used is described above. However, in the case of the storage device (the case of configuration example α) that does not use data encryption function, similar to the above case, if the correct password P is transmitted, the authentication is succeeded and the correct data D can be output.

For this reason, it is preferable that the correct data D be read from the storage device 10, only when the authorized host device 30A is used, and the data D be destructed when the host device 30B is used.

Figure 18:
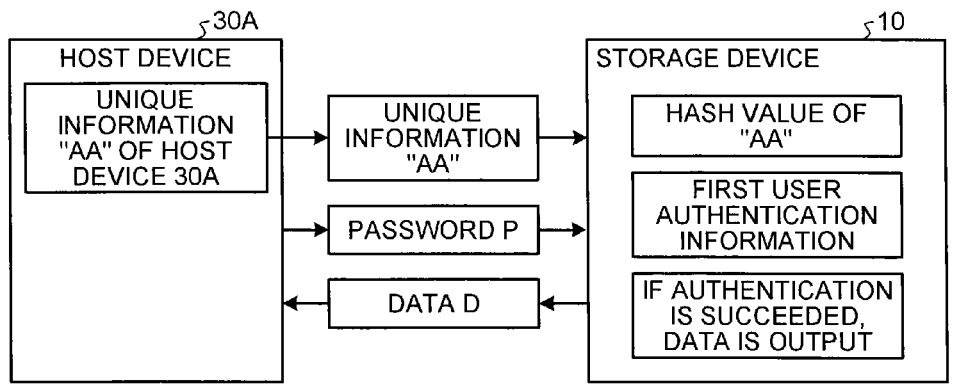
FIG. 18 is a schematic diagram illustrating an operation of the case where the authorized host device is connected to the storage device according to the second embodiment.
Figure 19:
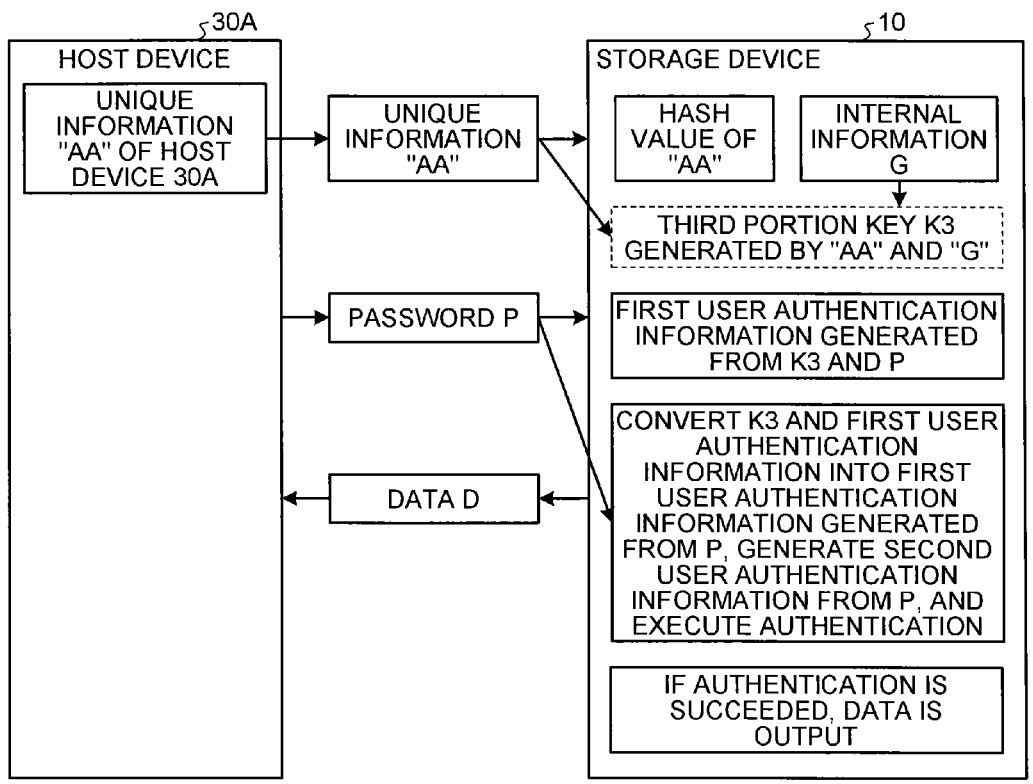
FIG. 19 is a schematic diagram illustrating an operation of the case where the authorized host device is connected to the storage device according to the second embodiment.
Figure 20:
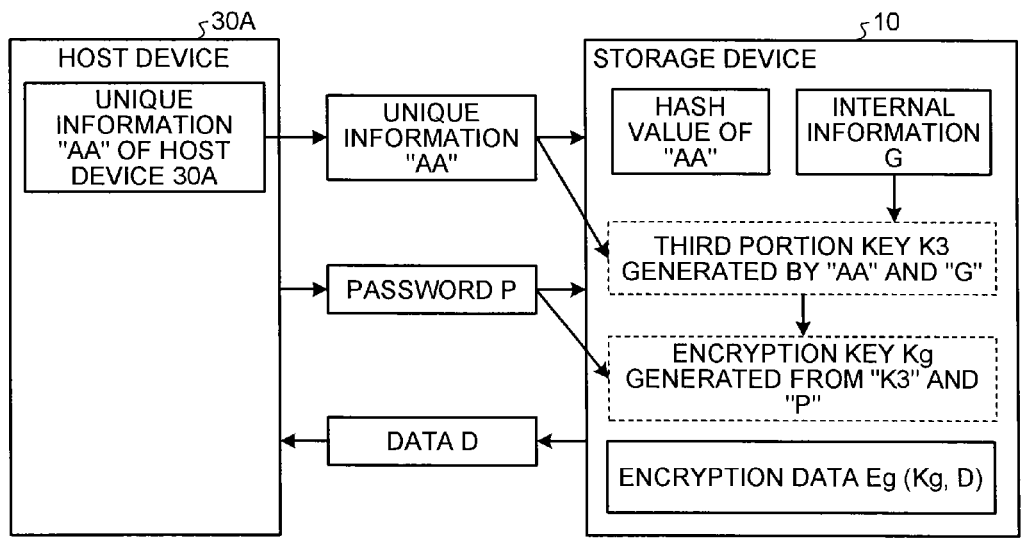
FIG. 20 is a schematic diagram illustrating an operation of the case where the authorized host device is connected to the storage device according to the second embodiment.
Figure 21:
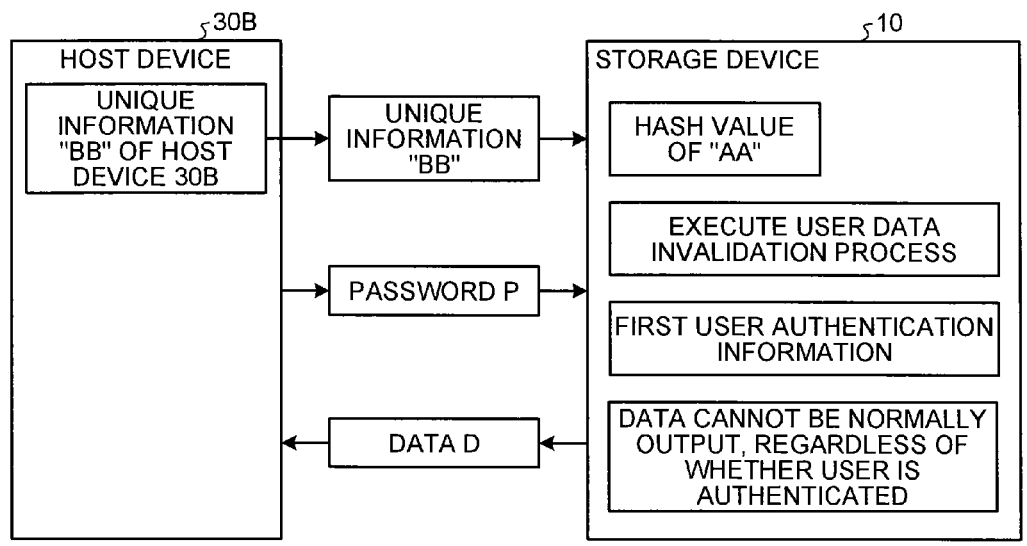
FIG. 21 is a schematic diagram illustrating an operation of the case where an unauthorized host device is connected to the storage device according to the second embodiment.
Figure 22:
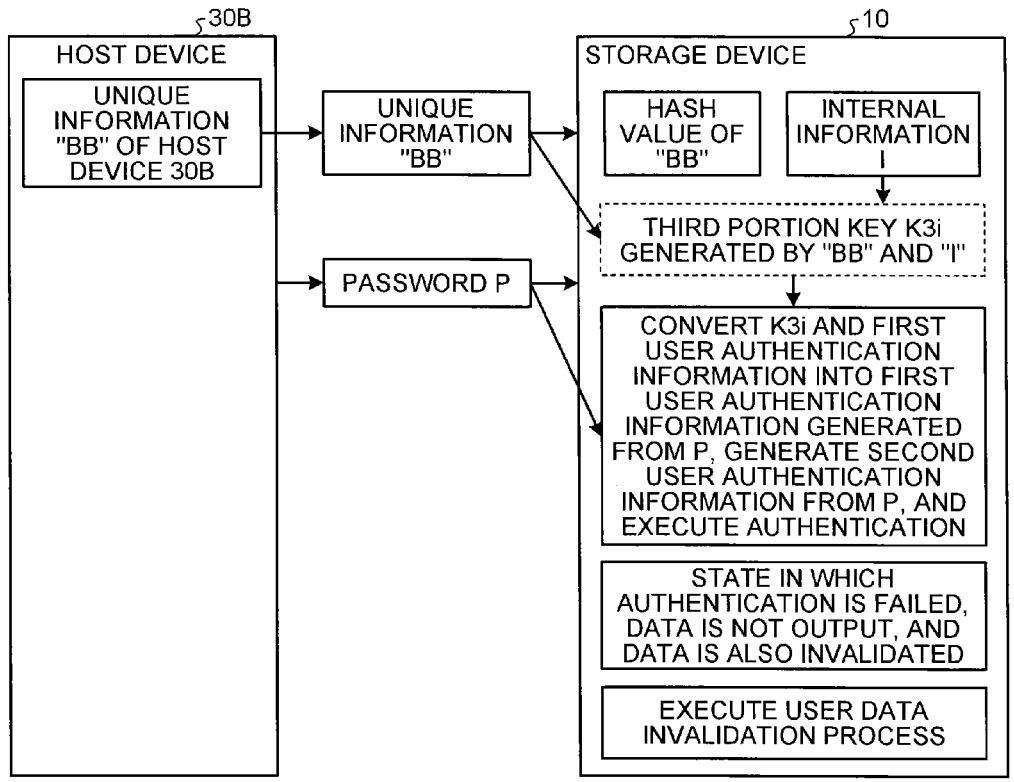
FIG. 22 is a schematic diagram illustrating an operation of the case where an unauthorized host device is connected to the storage device according to the second embodiment.
Figure 23:
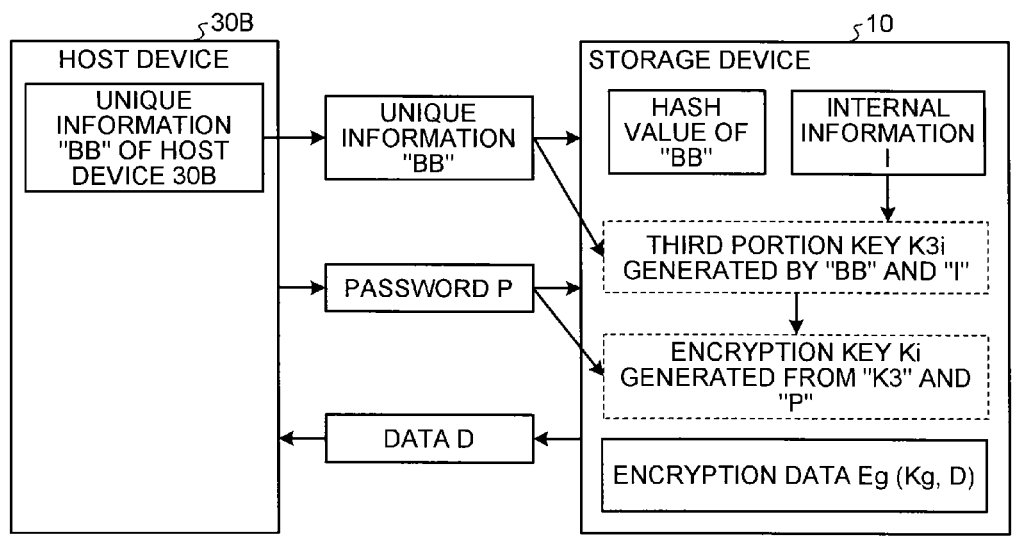
FIG. 23 is a schematic diagram illustrating an operation of the case where an unauthorized host device is connected to the storage device according to the second embodiment.

FIGS. 18 to 20 are schematic diagrams illustrating an operation of the case where the authorized host device 30A is connected to the storage device 10 according to the second embodiment. FIGS. 21 to 23 are schematic diagrams illustrating an operation of the case where the unauthorized host device 30B is connected to the storage device 10 according to the second embodiment.

FIGS. 18 and 21 illustrate the case where the storage device 10 has the configuration according to the configuration example α2 and FIGS. 19 and 22 illustrate the case where the storage device 10 has the configuration according to the configuration example α1. FIGS. 20 and 23 illustrate an example of the case where the storage device 10 has the configuration according to the configuration example β and does not execute the user data invalidation process, and this example can be applied the HDD.

In both the configuration example α and the configuration example β, when the operation illustrated in FIG. 14 is executed in a state in which the storage device 10 is connected to the authorized host device 30A, a value h (AA) that is obtained by executing a hash operation on the unique information "AA" transmitted by the host device 30A is matched with the hash value h (AA) that is previously stored in the storage device 10. When the hash values h (AA) are matched with each other, it is determined that the authentication is succeeded and the user data invalidation process is not executed.

In the storage devices 10 according to the configuration example α1 and the configuration example β, the received unique information "AA" of the host device 30A and the internal information G are combined and the third portion key K3 is generated. Then, the user authentication is executed. However, when the third portion key K3 is used, the third portion key K3 and the first user authentication information are combined and the user authentication is executed using the second user authentication information. In this example, in the storage device 10, information that is generated from the password P is used as the user authentication information. For example, a hash value of the password P may be handled as the user authentication information. In this embodiment, an exchange of a user ID with the host device 30A is not executed.

In the case of the configuration example β, the storage device 10 combines the third portion key K3 and the second user authentication information and sets a generated encryption key Kg to a decryption key. When the storage device 10 receives a read request of the data D from the host device 30A, the data D is correctly decrypted with the set decryption key Kg and is transmitted.

When the storage device 10 is connected to the unauthorized host device 30B, in both the case of the configuration example α and the case of the configuration example β, a value h (BB) that is obtained by executing a hash operation on the unique information "BB" transmitted by the host device 30B is not matched with the hash value h (AA) that is previously stored in the storage device 10. For this reason, the storage device 10 executes the user data invalidation process in the case of the configuration example α. In the cases of the configuration example α1 and the configuration example β, the storage device 10 destructs the internal information G and the previously stored hash value h (AA), generates the internal information I again by generation of a random number, generates the hash value of the unique information "BB" of the host device 30B, and writes the hash value in the system area 11a. At this time, the encryption key Kg is destructed.

In the case of the configuration example α1, when the method using the third portion key at the time of authenticating the user is used, the invalid third portion key and the first user authentication information are combined at the time of authenticating the user. Therefore, even though the second user authentication information is correct, the authentication is not succeeded.

If the read request of the data D is transmitted from the host device 30B, in the case of the configuration example β, the storage device 10 combines the unique information "BB" of the host device 30B and the internal information I, combines the generated third portion key K3i and the second user authentication information, and executes a decryption process on the encryption data Eg (Kg, D) using the generated encryption key Ki. During the decryption process, since the erroneous encryption key Ki is used, the correct data D cannot be read. Even when the storage device 10 does not have the encryption function (the case of the configuration example α), because the data invalidation process is executed, the correct data D cannot be output.

In the case of the configuration example α, because the data invalidation process is executed, the correct data D cannot be read, even though the storage device 10 is connected to the host device 30A again. In the case of the configuration example β, since the encryption key Kg and the internal information G are already destructed, the correct data cannot be read. Similar to the first embodiment, in the case of the configuration example β, the data invalidation process may be executed simultaneously when the key is destructed.

As described above, according to this embodiment, even though the specified configuration of the first embodiment is used such that the first apparatus authentication information is the hash value h (AA) of the unique information "AA" of the authorized host device 30A and the second apparatus authentication information is the unique information "AA" of the current host device 30A used as the second portion key, the same effect as that of the first embodiment can be obtained.

The device protecting the data by erasure of the encryption key, such as the HDD not having the data invalidation function may be configured such that the same handling can be made from the device and the host device.

Third Embodiment

Next, the third embodiment will be descried with reference to FIGS. 1 and 2 described above.

Figure 24:
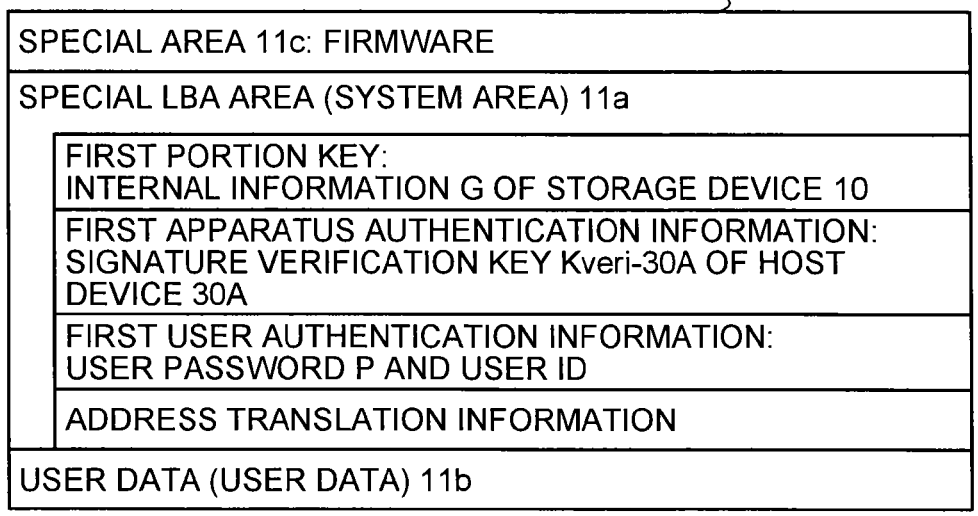
FIG. 24 is a schematic diagram illustrating data in a nonvolatile semiconductor memory in a third embodiment.

The third embodiment is another specific example of the first apparatus authentication information and the second apparatus authentication information in the first embodiment. That is, the first apparatus authentication information is a signature verification key Kveri-30A of the authorized host device 30A, as illustrated in FIG. 24.

Figure 25:
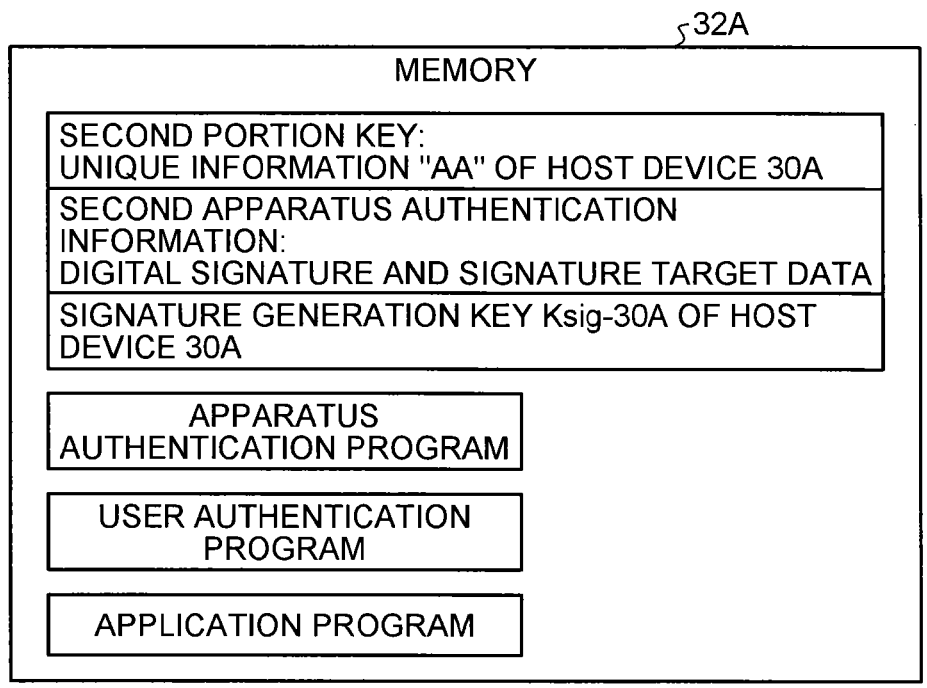
FIG. 25 is a schematic diagram illustrating data in a memory in the third embodiment.

As illustrated in FIG. 25, the second apparatus authentication information is a digital signature that is generated by a signature generation key Ksig-30A of the current host device 30A and signature target data that is used to generate the digital signature. The digital signature is generated by executing a signing process based on the signature generation key Ksig-30A with respect to the hash value calculated from the signature target data. The memory 32A of the host device 30A stores the signature generation key Ksig-30A.

As the signature generation key Ksig-30A, a private key of a public key pair can be used. As the signature verification key Kveri-30A, a public key of the public key pair can be used. For this reason, the signature generation key Ksig-30A may be read as the private key and the signature verification key Kveri-30A may be read as the public key. This can be applied to a signature generation key Ksig-10 and a signature verification key Kveri-10 of the storage device 10 to be described below.

The apparatus authentication module 21 of the storage device 10 decrypt the digital signature in the second apparatus authentication information based on the signature verification key Kveri-30A. The apparatus authentication module 21 collating obtained decryption data and a hash value calculated from the signature target data in the second apparatus authentication information, and determining that the apparatus authentication is failed, when the decryption data and the hash value are not matched with each other.

Figure 26:
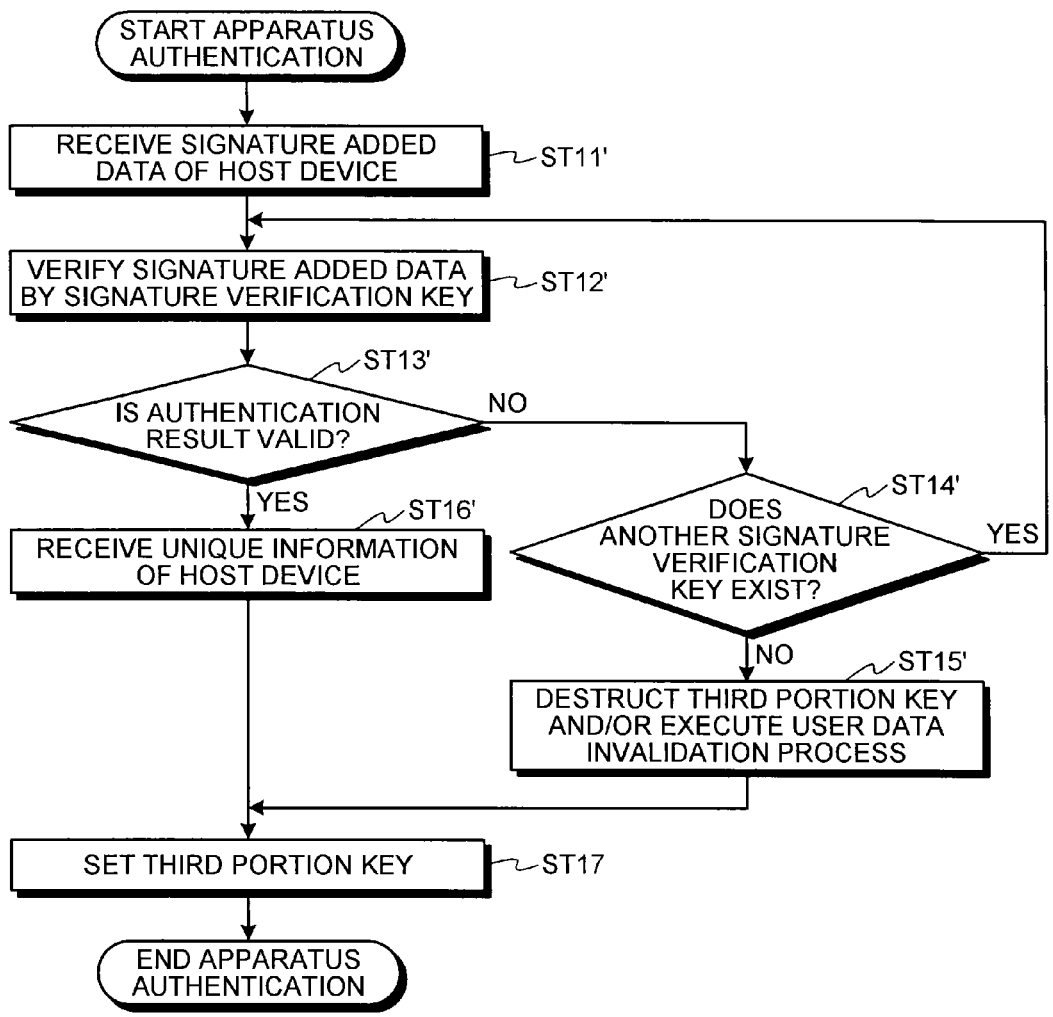
FIG. 26 is a flowchart illustrating an operation in the third embodiment.
Figure 27:
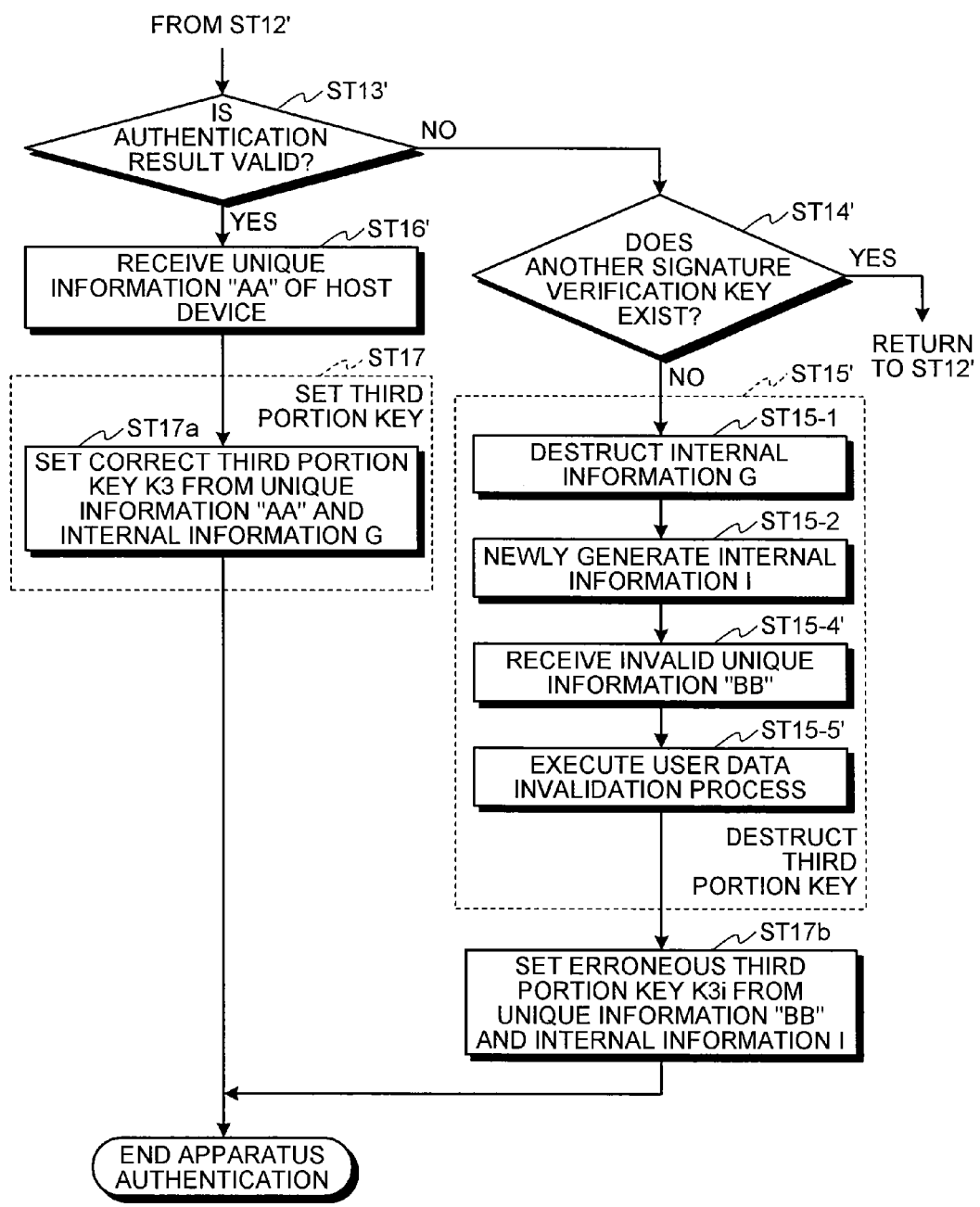
FIG. 27 is a flowchart illustrating an operation in the third embodiment.

Next, an operation of the storage system that has the above-described configuration will be described using flowcharts of FIGS. 26 and 27. FIGS. 26 and 27 illustrate an example of an operation of the case of the configuration example α1 or the configuration example β. In the case of the configuration example α2, the operation related to the third portion key is removed from the operation of FIGS. 26 and 27. However, a reception process of the unique information of the host device of step ST16' may not be removed to equalize the apparatus authentication sequence with the host between the configuration example α1 or the configuration example β and the configuration example α2. In this case, the received unique information is not used.

Now, the apparatus authentication of step ST10 starts.

If the storage device 10 is connected to the host device 30A, the CPU 34 of the host device 30A generates signature target data such as a random number, according to the predetermined authentication sequence of the apparatus authentication, and calculates a hash value of the signature target data. Next, the CPU 34 executes a signing process on the hash value, on the basis of the signature generation key Ksig-30A in the memory 32A, and generates a digital signature. Then, the CPU 34 writes signature added data including the signature target data and the digital signature as the second apparatus authentication information in the memory 32A and transmits the signature added data (second apparatus authentication information) to the storage device 10.

The apparatus authentication module 21 of the storage device 10 receives the signature added data of the newly connected current host device 30A (step ST11'). When the authentication is failed, the apparatus authentication module 21 receives the signature added data from the current host device 30B.

The apparatus authentication module 21 verifies the signature added data by the signature verification key Kveri-30A in the system area 11a (step ST12'). Specifically, the apparatus authentication module 21 decrypts the digital signature in the received signature added data, on the basis of the signature verification key Kveri-30A, collates obtained decryption data and a hash value calculated from the signature target data in the second apparatus authentication information, and verifies that the decryption data and the hash value are matched with each other.

If the authentication result is invalid (step ST13': No), the apparatus authentication module 21 determines whether another signature verification key Kveri previously stored in the system area 11a exists (step ST14'). If another signature verification key Kveri exists (step ST14': Yes), the process returns to step ST12', such that a collation process is executed again using another signature verification key Kveri. Since the process of step ST14' is a process of when the number of connectable authorized host devices 30A . . . is plural, step ST14' can be skipped when only one authorized host device 30A exists.

When the determination result of step 14' is No (step ST14': No), the apparatus authentication module 21 executes the user data invalidation process in the cases of the configuration example α1 and the configuration example α2 (step ST15'). In the cases of the configuration example α1 and the configuration example β, the third portion key is destructed (step ST15'). Specifically, as illustrated in FIG. 27, the apparatus authentication module 21 destructs the valid internal information G in the system area 11a (step ST15-1) and newly generates internal information I such as a random number (step ST15-2). The apparatus authentication module 21 receives the unique information "BB" from the current host device 30B (step ST15-4') and executes the user data invalidation process in the case of the configuration example α (step ST15-5). The user data invalidation process is not executed after step ST15-4', and may be executed immediately after any one of steps ST14', ST15-1, and ST15-2. Similar to the above case, since the third portion key K3 is destructed by steps ST15-1 and ST15-2, the encryption key Kg is destructed in the case of the configuration example β.

Meanwhile, if the verification result of step ST13' is valid (step ST13': Yes), the apparatus authentication module 21 receives the unique information "AA" from the current host device 30A (step ST16'). Then, in the cases of the configuration example α1 and the configuration example β, the apparatus authentication module 21 writes the correct third portion key K3 in the SRAM 25, as described above (step ST17a). When the plural authorized host devices reads data from a common user data area, similar to the second embodiment, the plural authorized host devices need to have information corresponding to the plural host devices or common unique information "AA" as the internal information G.

When the third portion key K3 is destructed in step ST15, the apparatus authentication module 21 writes the erroneous third portion key K3i in the SRAM 25, as described above (step ST17b).

At any rate, in the cases of the configuration examples α1 and β, the apparatus authentication of step ST10 is completed by writing of the encryption key.

Hereinafter, similar to the first embodiment, steps ST20 to ST60 (or steps ST120 to ST160) are executed.

As described above, according to this embodiment, even though the specified configuration of the first embodiment is used such that the first apparatus authentication information is the signature verification key Kveri-30A of the authorized host device 30A and the second apparatus authentication information is the digital signature and the signature target data of the host device 30A, the same effect as that of the first embodiment can be obtained.

This embodiment is not limited to the signature authentication and authentication by transmission and reception of one-time information by challenge and response may be used. This kind of authentication may be executed like the following [1] to [3].

[1] The apparatus authentication module 21 generates a random number r, executes an encryption process on the random number r using the signature verification key Kveri-30A (public key of the host device 30A), and transmits an obtained value C (=r^Kveri-30A) to the host device 30A (or 30B, . . . ) (^ is a symbol that shows power).

[2] The host device 30A (or 30B, . . . ) executes a decryption process on the value C using the signature generation key Ksig-30A (private key of the host device 30A) and returns a obtained value t=(C^Ksig-30A) to the apparatus authentication module 21.

[3] The apparatus authentication module 21 determines that the apparatus authentication is succeeded, when the generated random number r and the returned value t are matched with each other (r=t).

Fourth Embodiment

Next, the fourth embodiment will be described with reference to FIG. 1 described above.

The fourth embodiment is another specific example of the apparatus authentication in the first to third embodiments. In this embodiment, the apparatus authentication module 21 of the storage device 10 has a function of determining that the apparatus authentication is failed, when it is detected that an authentication sequence of when the current host device 30A (or 30B, . . . ) transmits the second apparatus authentication information is different from the predetermined authentication sequence, in addition to the above-described functions.

Figure 28:
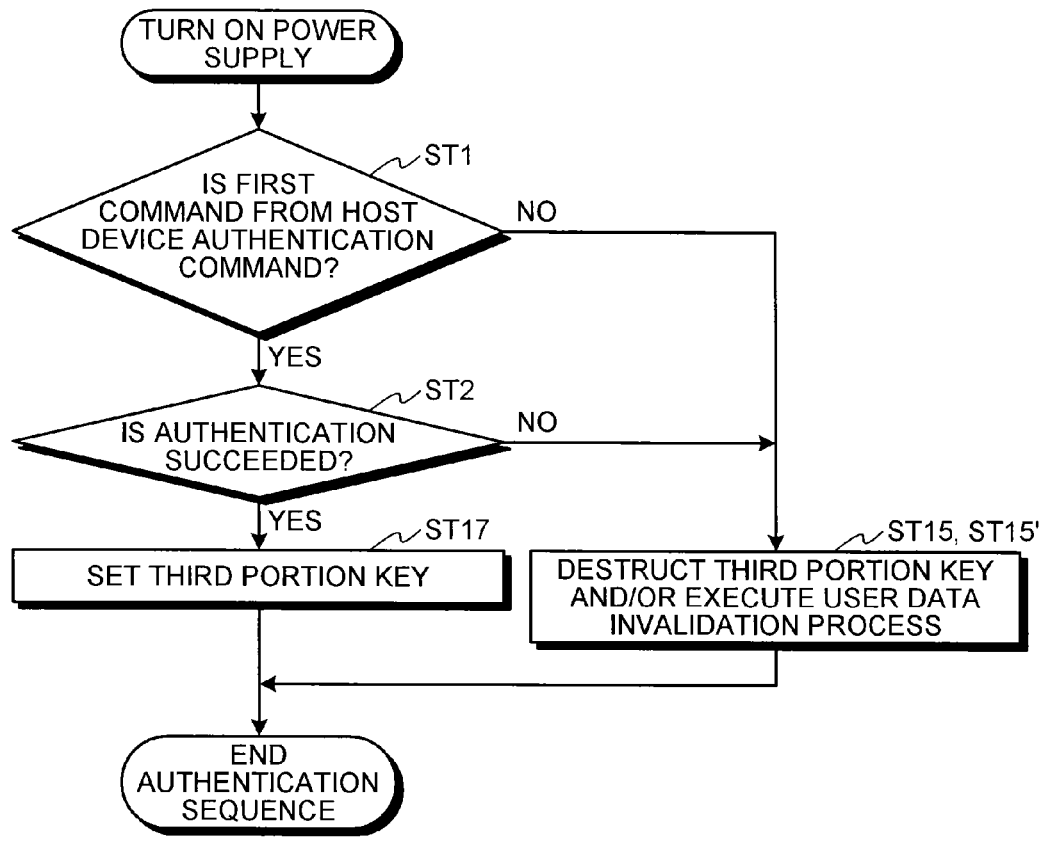
FIG. 28 is a flowchart illustrating an operation in a fourth embodiment.

Next, an operation of the storage system that has the above-described configuration will be described using a flowchart of FIG. 28. FIG. 28 illustrates an operation of the cases of the configuration example α1 and the configuration example β. In the case of the configuration example α2, the operation related to the third portion key is removed from the operation of FIG. 28.

Now, the apparatus authentication of step ST10 (or step ST110) starts.

If the storage device 10 is connected to the host device 30A, the CPU 34 of the host device 30A transmits an authentication command according to the predetermined authentication sequence of the apparatus authentication and transmits the second apparatus authentication information to the storage device 10.

The apparatus authentication module 21 of the storage device 10 determines whether a first command received from the newly connected current host device 30A (or 30B, . . . ) is the authentication command (step ST1).

When the determination result of step ST1 is No (step ST1: No), the apparatus authentication module 21 detects that the apparatus sequence is different from the predetermined authentication sequence, determines that the apparatus authentication is failed, and proceeds to step ST15 (or step ST15').

When the first command is the authentication command as the determination result of step ST1 (step ST1: Yes), the apparatus authentication module 21 proceeds to step ST2 and executes the apparatus authentication. In this case, the apparatus authentication of step ST2 is the process other than the data invalidation process, the destruction of the third portion key, and the setting of the third portion key, in the apparatus authentication (step ST10 or ST110) according to each embodiment. For example, in the case of the second embodiment, steps ST11 to ST14 and ST16 illustrated in FIG. 14 correspond to step ST2 illustrated in FIG. 28. In the case of the third embodiment, steps ST11' to ST14' and ST16' illustrated in FIG. 26 correspond to step ST2 illustrated in FIG. 28.

If the apparatus authentication of step ST2 is succeeded, the apparatus authentication module 21 proceeds to step ST17. If the apparatus authentication of step ST2 is failed (step ST2: No), the apparatus authentication module 21 ends the process through step ST15 (or step ST15').

In step 15 (or step ST15'), the user data invalidation process is executed and the third portion key is destructed (step ST15). In the case of the configuration example 1, the user data invalidation process may not be executed. In step 17, the third portion key is set in the cases of the configuration example α1 and the configuration example 3.

Hereinafter, similar to the first to third embodiments, steps ST20 to ST60 (or steps ST120 to ST160) are executed.

As described above, according to this embodiment, even though the specified configuration of the first to third embodiments is used such that the apparatus authentication module 21 determines that the apparatus authentication is failed, when it is detected that the authentication sequence of when the current host device 30A (or 30B, . . . ) transmits the second apparatus authentication information is different from the predetermined authentication sequence, the same effect as those of the first to third embodiments can be obtained.

The host device that can use the storage device 10 is limited to the host device 30A having the same authentication sequence as the authentication sequence of the storage device 10. Therefore, when the storage device 10 is stolen, the data D is destructed and the data leakage can be prevented.

Instead of step ST1, it may be determined whether the user data read request is transmitted from the host device, before the first authentication command is transmitted from the host device. When a command to determine a type of a drive or a command to obtain identification information is transmitted before the authentication command is transmitted from the host device, executing the key destruction process or the user data invalidation process with respect to clearly suspicious access such as when the data read request is first transmitted before the authentication command is transmitted is more preferable than executing the user data invalidation process immediately, because useful information can be provided to the host device before the authentication, without losing a defense effect. In particular, in the storage device that is connected to the plural authorized host devices, before the apparatus authentication, commands to obtain identification information of the storage devices to which the host devices are connected are transmitted to the storage devices, the storage devices transmit the identification information to the host devices, and different unique information or apparatus authentication information can be set to each storage device. Thereby, because the host devices do not need to set common information to the plural storage devices, even though information management of a certain storage device has weakness and unique information or apparatus authentication information leaks, safety of the other storage devices can be prevented from being deteriorated.

In the device that does not correspond to the authentication, an authentication command is not executed and a user data output request is transmitted. Even when the storage device is connected to this device, the data invalidation process can be immediately executed.

Fifth Embodiment

Next, the fifth embodiment will be described with reference to FIGS. 1 and 2 described above.

Figure 29:
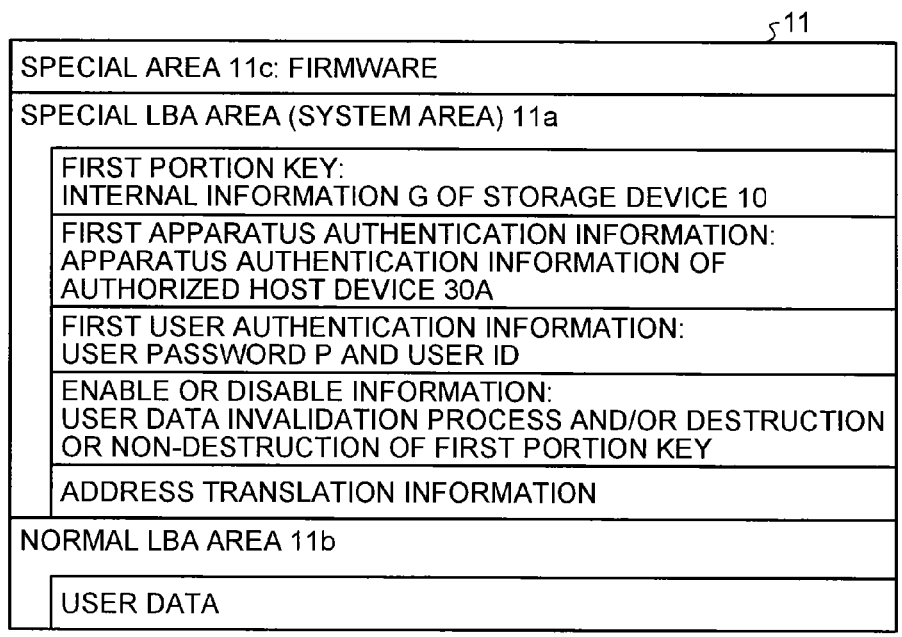
FIG. 29 is a schematic diagram illustrating data in a nonvolatile semiconductor memory in a fifth embodiment.

The fifth embodiment is another specific example of the apparatus authentication in the first to fourth embodiments. That is, as illustrated in FIG. 29, the system area 11a of the storage device 10 stores enable or disable information that indicates whether the first portion key is destructed or not, in addition to the information described above.

The apparatus authentication module 21 has a setting function of setting the enable or disable information to the system area 11a, when a setting request including the enable or disable information is received from the authorized host device 30A, in addition to the above-described functions. A terminology of "setting" may be read as "writing".

The apparatus authentication module 21 has an invalidation preventing function of preventing execution of the user data invalidation process, on the basis of the enable or disable information in the system area 11a, when the apparatus authentication is failed. When the enable or disable information is set to non-destruction, the apparatus authentication module 21 prevents the user data invalidation process. In the cases of the configuration example α1 and the configuration example β, the storage device 10 prevents destruction of the first portion key (internal information G).

The apparatus authentication module 21 has an error output function of outputting error of the apparatus authentication to the current host device 30A (or 30B, . . . ) without operating the above-described third portion key writing function (only the cases of the configuration example α1 and the configuration example β) and the user authentication module 22 and the decryption module 24 (only the case of the configuration example β), when the user data invalidation process is prevented and destruction of the first portion key is also prevented in the cases of the configuration example α1 and the configuration example β.

Meanwhile, the input module 33 of the host device 30A has a setting request receiving function of receiving an input of the setting request including the enable or disable information, according to the operation from the user, in addition to the above-described functions.

The CPU 34 of the host device 30A has a setting request transmitting function of transmitting the received setting request to the storage device 10, in addition to the above-described functions.

Next, an operation of the storage system that has the above-described configuration will be described using a flowchart of FIG. 30. The process related to the third portion key and the process related to setting of the encryption key are not executed according to the configuration example.

First, setting of an operation at the time of authentication failure in step ST30 after the apparatus authentication of step ST10' and the user authentication of step ST20 are succeeded by the authorized host device 30A and the authorized user will be described.

In step ST10', similar to step ST10 or step ST110, when the apparatus authentication is executed and the authentication result is No, the storage device 10 outputs error to the connected host device 30A (or 30B, . . . ) and sets the correct third portion key or the erroneous third portion key according to the authentication result in the cases of the configuration example α1 and the configuration example β (step S10'). Next, step ST20 (or step S120) is executed.

The input module 33 of the host device 30A receives the input of the setting request including the enable or disable information, according to the operation from the user. The CPU 34 of the host device 30A transmits the received setting request to the storage device 10, when the authentication is succeeded after step ST20. When the authentication is failed, the CPU 34 executes the operation at the time of the authentication failure, similar to the first embodiment (step ST30).

If the apparatus authentication module 21 of the storage device 10 receives the setting request including the enable or disable information from the authorized host device 30A, the apparatus authentication module 21 sets the enable or disable information to the system area 11a.

In this way, step ST30 is completed. Hereinafter, steps ST40 and ST50 are executed, the power supply is turned off, and the operation ends (step ST60). Even after the power supply is turned off, the enable or disable information is not erased and is stored in the system area 11a. In the case of the configuration example β, decryption using the set encryption key is executed at the time of the read process and encryption using the set encryption key is executed at the time of the write process.

Next, the storage device 10 is connected to the current host device 30B by the user and the power supply is turned on. Thereby, the storage device 10 executes the apparatus authentication with respect to the host device 30B (step ST10'). It is determined that the current host device 30B is an unauthorized device.

If the storage device 10 is connected to the host device 30B, the CPU 34 of the host device 30B transmits the second apparatus authentication information in the memory 32B to the storage device 10, according to the predetermined authentication sequence of the apparatus authentication.

The apparatus authentication module 21 of the storage device 10 executes the apparatus authentication, on the basis of the second apparatus authentication information received from the newly connected current host device 30B and the first apparatus authentication information in the system area 11a.

However, the apparatus authentication with respect to the unauthorized host device 30B is failed. A point of time when the apparatus authentication is failed is a point of time immediately before steps ST15 and ST15' in the second to fourth embodiments.

When the apparatus authentication is failed, the apparatus authentication module 21 of the storage device 10 prevents the user data invalidation process on the basis of the enable or disable information in the system area 11a, in the case of the configuration example α, and prevents destruction of the first portion key (internal information G), in the cases of the configuration example α1 and the configuration example β.

Then, the apparatus authentication module 21 outputs the error of the apparatus authentication to the current host device 30B without operating the above-described third portion key writing function (only the cases of the configuration example α1 and the configuration example β) and the user authentication module 22 and the decryption module 24 (only the case of the configuration example β), when the user data invalidation process or the destruction of the first portion key is prevented.

As described above, according to this embodiment, execution or non-execution of the user data invalidation process can be set by the enable or disable information and destruction or non-destruction of the first portion key can be set by the enable or disable information when the storage device has the internal information G. Therefore, when destruction is set, the effects of the first to fourth embodiments can be obtained. When non-destruction is set, the user data invalidation can be prevented. When the storage device has the encryption function, destruction of the key of the encryption data can be prevented.

Sixth Embodiment

Next, the sixth embodiment will be described with reference to FIG. 1 described above.

The sixth embodiment is another specific example of the apparatus authentication in the first to fourth embodiments. In other words, the sixth embodiment has the configuration using the permitted connection number of times, instead of the enable or disable information according to the fifth embodiment.

That is, as illustrated in FIG. 31, the system area 11a of the storage device 10 stores permitted connection number of times (retry number of times) that indicates new connection number of times permitted until the first portion key is destructed and error number of times that indicates the number of times of failing to execute the apparatus authentication, in addition to the above information.

The apparatus authentication module 21 sets the permitted connection number of times to the system area 11a, when a setting request including the permitted connection number of times is received from the authorized host device 30A, in addition to the above-described functions.

The apparatus authentication module 21 has an error number of times updating function of updating the error number of times in the system area 11a to increase the error number of times, when the apparatus authentication is failed.

The apparatus authentication module 21 has a destruction preventing function of preventing the user data invalidation process on the basis of the error number of times after the update and the permitted connection number of times in the system area 11a (in the case of the configuration example α) and preventing destruction of the first portion key (internal information G) in the cases of the configuration example α1 and the configuration example β.

The apparatus authentication module 21 has an error output function of outputting error of the apparatus authentication to the current host device 30A (or 30B, . . . ) without operating the above-described third portion key writing function (only the cases of the configuration example α1 and the configuration example β) and the user authentication module 22 and the decryption module 24 (only the case of the configuration example β), when the user data invalidation process is prevented and destruction of the first portion key is prevented in the case where the storage device has the internal information G.

Meanwhile, the input module 33 of the host device 30A has a setting request receiving function of receiving an input of the setting request including the enable or disable information, according to the operation from the user, in addition to the above-described functions.

The CPU 34 of the host device 30A has a setting request transmitting function of transmitting the received setting request to the storage device 10, in addition to the above-described functions.

Figure 32:
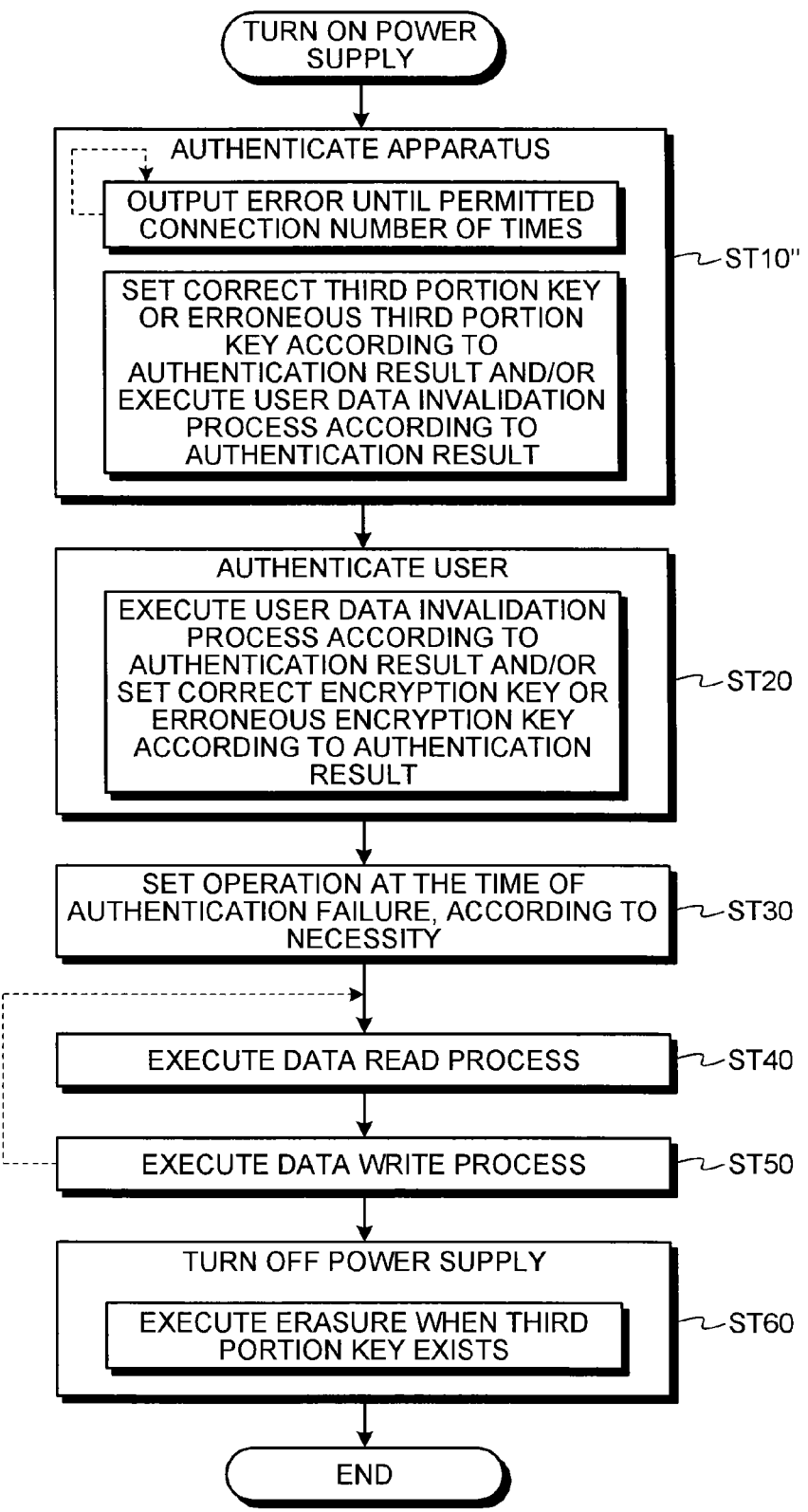
FIG. 32 is a flowchart illustrating an operation in the sixth embodiment.

Next, an operation of the storage system that has the above-described configuration will be described using a flowchart of FIG. 32. The process related to the third portion key and the process related to setting of the encryption key are not executed according to the configuration example.

First, similar to the fifth embodiment, in setting of an operation at the time of authentication failure in step ST30, the permitted connection number of times is set to the system area 11a of the storage device 10. Then, the power supply is turned off and the operation ends (step ST60). Even after the power supply is turned off, the permitted connection number of times is not erased and is stored in the system area 11a.

Next, the storage device 10 is connected to the current host device 30B by the user and the power supply is turned on. Thereby, the storage device 10 executes the apparatus authentication with respect to the host device 30B (step ST10"). It is determined that the current host device 30B is an unauthorized device.

For this reason, similar to the fifth embodiment, the apparatus authentication with respect to the unauthorized host device 30B is failed. A point of time when the apparatus authentication is failed is a point of time immediately before steps ST15 and ST15' in the second to fourth embodiments.

When the apparatus authentication is failed, the apparatus authentication module 21 of the storage device 10 updates the error number of times in the system area 11a to increase the error number of times and prevents the user data invalidation process on the basis of the error number of times after the update and the permitted connection number of times (the case of the configuration example α). The apparatus authentication prevents destruction of the first portion key (internal information G) in the cases of the configuration example α1 and the configuration example β.

Then, the apparatus authentication module 21 outputs the error of the apparatus authentication to the current host device 30B without operating the above-described third portion key writing function (only the cases of the configuration example α1 and the configuration example β) and the user authentication module 22 and the decryption module 24 (only the case of the configuration example β), when the user data invalidation process is prevented (the case of the configuration example α) and the destruction of the first portion key is prevented in the cases of the configuration example α1 and the configuration example β.

As described above, according to this embodiment, destruction or non-destruction of the first portion key can be set by the permitted connection number of times. Therefore, the destruction of the encryption data can be prevented until the connection number of times reaches the permitted connection number of times and the effects of the first to fourth embodiments can be obtained after the connection number of times reaches the permitted connection number of times.

Seventh Embodiment

Next, the seventh embodiment will be described with reference to FIGS. 1 and 2 described above.

The seventh embodiment has the configuration that stores destruction log information when the user data invalidation process is executed and when the first portion key is destructed in the cases of the configuration example α1 and the configuration example β, in the first to sixth embodiments.

Figure 33:
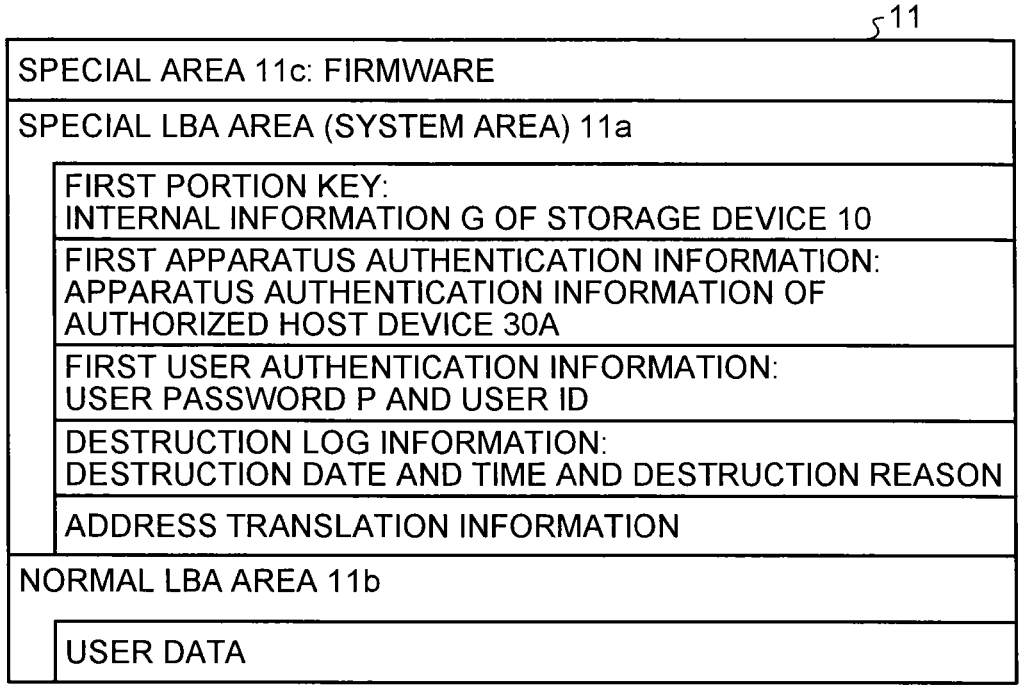
FIG. 33 is a schematic diagram illustrating data in a nonvolatile semiconductor memory in a seventh embodiment.
Figure 34:
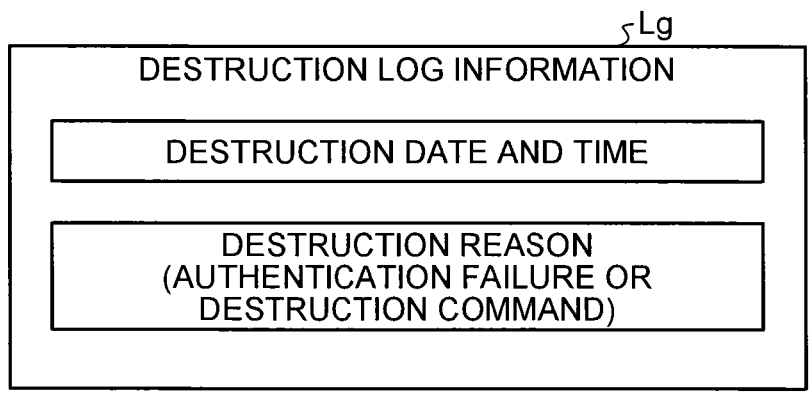
FIG. 34 is a schematic diagram illustrating destruction log information in the seventh embodiment.

Specifically, as illustrated in FIGS. 33 and 34, the system area 11a of the storage device 10 stores destruction log information Lg and destruction reason information in addition to the above-described information. The log information Lg includes destruction date and time information indicating a date and time when the user data invalidation process is executed (date and time when the first portion key is destructed in the cases of the configuration example α1 and the configuration example β). The destruction reason information indicates the failure of the apparatus authentication. The destruction reason information is not limited to the failure of the apparatus authentication and may indicate that the first portion key is destructed according to a valid destruction command.

The apparatus authentication module 21 has a destruction log writing function of generating the destruction log information Lg and writing the destruction log information in the system area 11a, when the user data invalidation process is executed (when the first portion key is destructed in the cases of the configuration example α1 and the configuration example β), in addition to the above-described functions. The destruction log information Lg can be read from the system area 11a, according to a read request from the authorized host device 30A.

According to the above configuration, as described above, when the apparatus authentication is failed, the user data is invalidated, that is, destructed. A point of time when the user data is destructed is a point of time immediately after steps ST15 and ST15' in the second to fourth embodiments.

At this time, the apparatus authentication module 21 generates the destruction log information Lg that includes the destruction date and time information indicating a date and time when the user data is destructed and the destruction reason information indicating the failure of the apparatus authentication and writes the destruction log information in the system area 11a. Thereby, after the storage device 10 is collected from the theft destination, the destruction log information Lg is read from the system area 11a, according to a read request from the authorized host device 30A.

As described above, according to this embodiment, the destruction log information Lg is stored when the user data is destructed. Therefore, in addition to the effects of the first to sixth embodiments, the authorized user can known the destruction date and time and the destruction reason.

Eighth Embodiment

Next, the eighth embodiment will be described with reference to FIGS. 1 and 2 described above.

The eighth embodiment has the configuration that stores a destruction certificate where a digital signature is given to the destruction log information Lg in the seventh embodiment.

Figure 35:
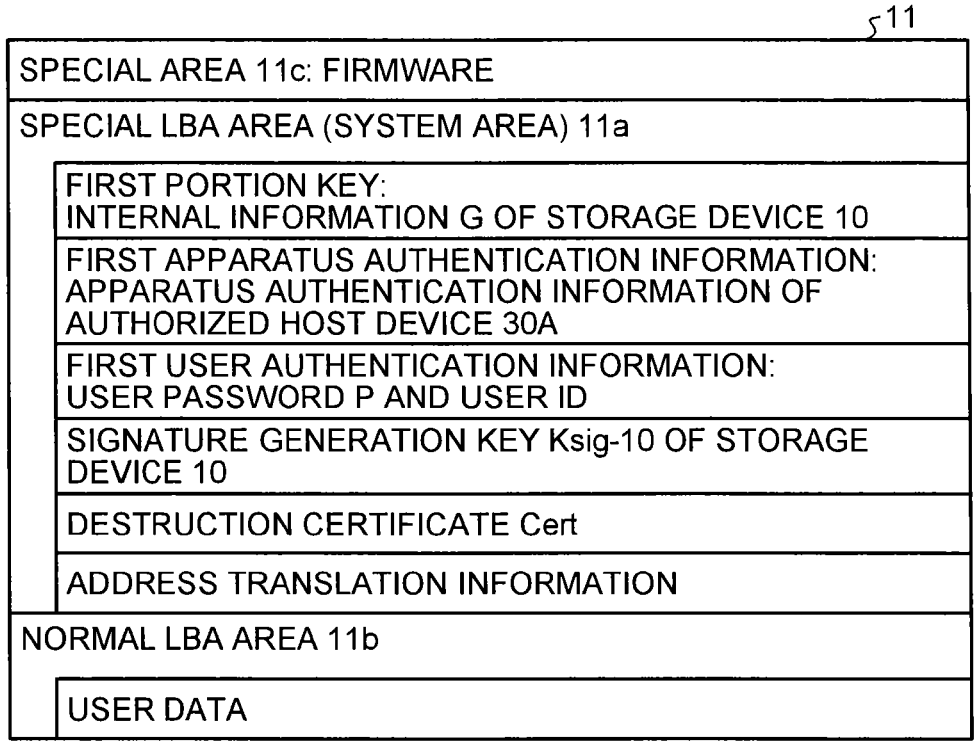
FIG. 35 is a schematic diagram illustrating data in a nonvolatile semiconductor memory in an eighth embodiment.
Figure 36:
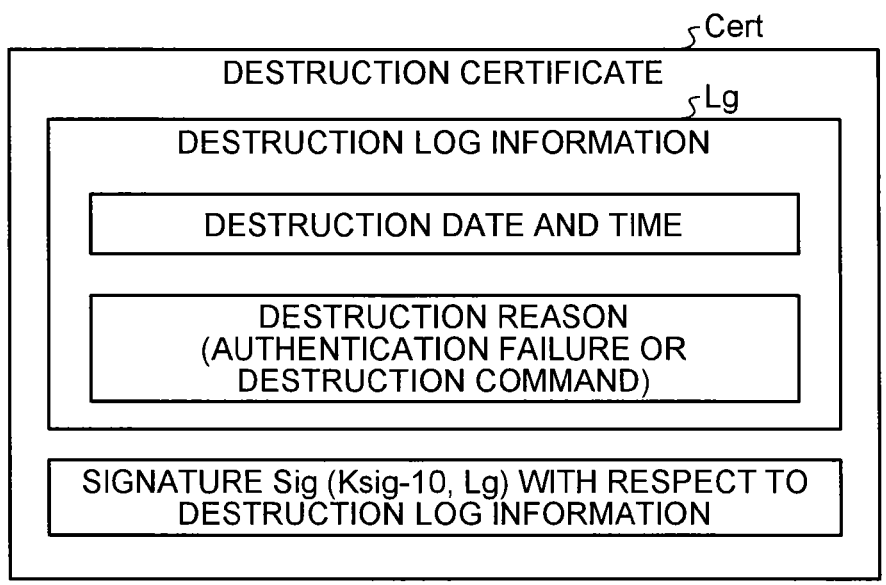
FIG. 36 is a schematic diagram illustrating a destruction certificate in the eighth embodiment.

Specifically, as illustrated in FIG. 35, the system area 11a of the storage device 10 previously stores a signature generation key Ksig-10 of the self device, in addition to the above-described information. In this case, the signature generation key Ksig-10 of the self device is not limited to a signature generation key for each storage device 10 (for each manufacturing number or model number). For example, as the signature generation key Ksig-10 of the self device, a signature generation key for each maker of the storage device 10 or a signature generation key for each vendor of the storage device 10 may be used. As illustrated in FIGS. 35 and 36, the system area 11a stores the destruction certificate Cert that includes the destruction log information Lg and the digital signature.

The apparatus authentication module 21 has a signature generating function of executing a signing process on the destruction log information Lg in the system area 11a on the basis of the signature generation key Ksig-10 in the system area 11a and generating a digital signature Sig (Ksig-10, Lg), in addition to the above-described functions.

Further, the apparatus authentication module 21 has a destruction certificate generating function of generating the destruction certificate Cert including the destruction log information Lg and the digital signature Sig (Ksig-10, Lg) and writing the destruction certificate Cert in the system area 11a.

Similar to the above case, the destruction certificate Cert can be read from the system area 11a, according to a read request from the authorized host device 30A.

Figure 37:
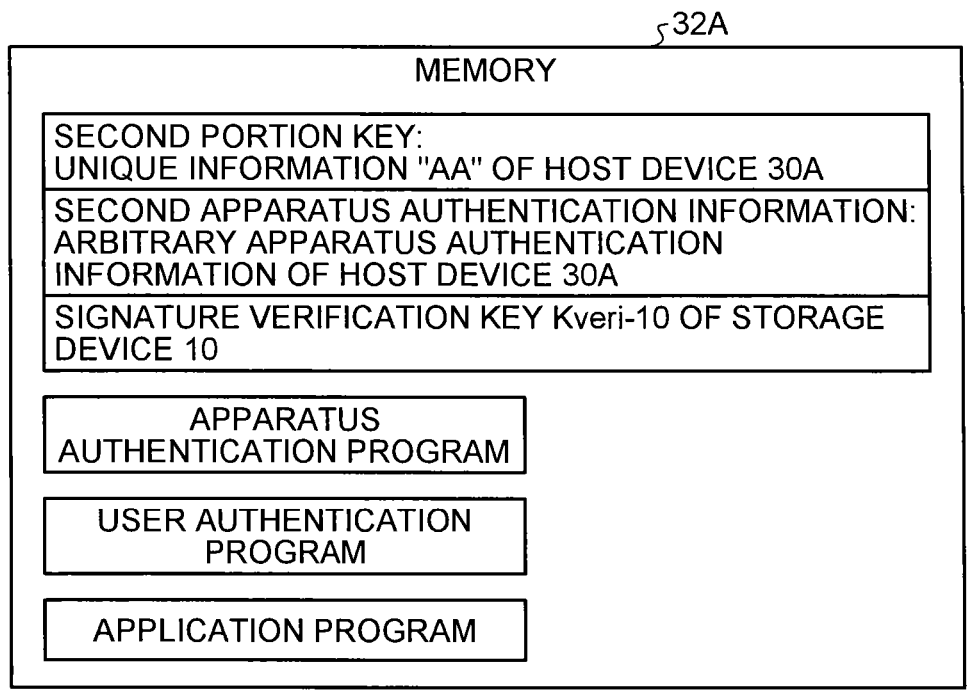
FIG. 37 is a schematic diagram illustrating data in a memory in the eighth embodiment.

Meanwhile, as illustrated in FIG. 37, the memory 32A of the host device 30A previously stores the signature verification key Kveri-10 of the storage device 10, in addition to the above-described information.

The CPU 34 of the host device 30A has a function of verifying the destruction certificate Cert read from the storage device 10 according to the read request, on the basis of the signature verification key Kveri-10 in the memory 32A, in addition to the above-described functions.

According to the above configuration, when the destruction log information Lg is written in the system area 11a in the seventh embodiment, the apparatus authentication module 21 executes the signing process on the destruction log information Lg in the system area 11a on the basis of the signature generation key Ksig-10 in the system area 11a and generates the digital signature Sig (Ksig-10, Lg).

The apparatus authentication module 21 generates the destruction certificate Cert including the destruction log information Lg and the digital signature Sig (Ksig-10, Lg) and writes the destruction certificate Cert in the system area 11a. Thereby, after the storage device 10 is collected from the theft destination, the destruction certificate Cert is read from the system area 11a, according to a read request from the authorized host device 30A.

The CPU 34 of the authorized host device 30A verifies the read destruction certificate Cert on the basis of the signature verification key Kveri-10 in the memory 32A and outputs the destruction certificate Cert to the output module 35, when the verification result is valid.

As described above, according to this embodiment, the destruction certificate Cert where the digital signature is added to the destruction log information Lg is stored. Therefore, in addition to the effect of the seventh embodiment, validity of the destruction log information Lg can be verified.

Ninth Embodiment

Next, the ninth embodiment will be described with reference to FIGS. 1 and 2 described above.

The ninth embodiment is another specific example of the user authentication in the first to eighth embodiments.

That is, the user authentication module 22 of the storage device 10 has a function of determining that the user authentication is failed, when it is detected that an authentication sequence of when the current host device 30A (or 30B, ... ) transmits the second apparatus authentication information is different from the predetermined authentication sequence, in addition to the above-described functions. For example, the user authentication module 22 determines whether a first command received from the newly connected current host device 30A (or 30B, ... ) is an authentication command. When the determination result is No, the user authentication module 22 detects that the authentication sequence is different from the predetermined authentication sequence. Or, when the read request is transmitted from the host device before the user is authenticated, the user authentication module 22 may detect that the authentication sequence is different from the predetermined authentication sequence.

According to the above configuration, the user authentication module 22 determines that the user authentication is failed, when it is detected that the authentication sequence of the current host device 30A (or 30B, ... ) is different from the predetermined authentication sequence. Therefore, in addition to the effects of the first to eighth embodiments, invalidity can be detected from the difference of the authentication sequences of the user authentication, in the unauthorized host device 30B where the apparatus authentication is succeeded.

Tenth Embodiment

Next, the tenth embodiment will be described with reference to FIGS. 1 and 2 described above.

The tenth embodiment has the configuration where destruction or non-destruction at the time of failing to execute the user authentication is set in the first to ninth embodiments.

Specifically, the system area 11a of the storage device 10 stores enable or disable information that indicates whether the first portion key and the third portion key are destructed, in addition to the above-described information (cases of the configuration example α1 and the configuration example β).

The user authentication module 22 has a setting function of setting the enable or disable information to the system area 11a, when a setting request including the enable or disable information is received from the authorized host device 30A, in addition to the above-described functions.

Further, the user authentication module 22 has a destruction preventing function of preventing the user data invalidation process on the basis of the enable or disable information in the system area 11a and preventing destruction of the first portion key and the third portion key in the case where the storage device has the encryption function, when the user authentication is failed.

Further, the user authentication module 22 has an error output function of outputting error of the user authentication to the current host device 30A (or 30B, ... ) without operating the data read module 27, when the user data invalidation process is prevented.

The user authentication module 22 does not operate the decryption module 24, when the destruction of the first portion key and the third portion key is prevented, in the case of the configuration example β.

Meanwhile, the input module 33 of the host device 30A has a setting request receiving function of receiving an input of the setting request including the enable or disable information, according to the operation from the user, in addition to the above-described functions.

The CPU 34 of the host device 30A has a setting request transmitting function of transmitting the received setting request to the storage device 10, in addition to the above-described functions.

Figure 38:
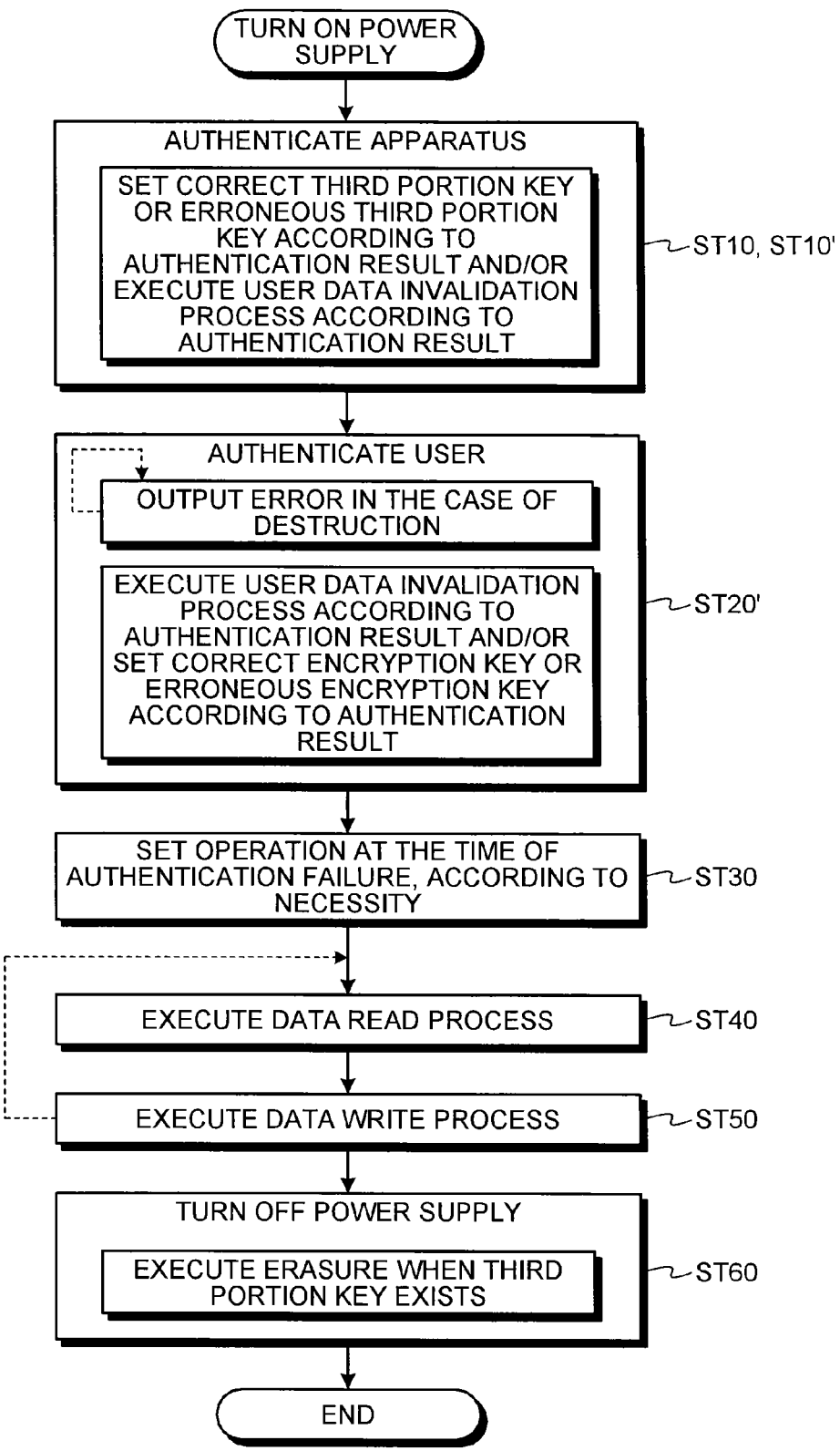
FIG. 38 is a flowchart illustrating an operation in a tenth embodiment.

Next, an operation of the storage system that has the above-described configuration will be described using a flowchart of FIG. 38. The process related to the third portion key and the process related to setting of the encryption key are not executed according to the configuration example.

First, similar to the fifth embodiment, in setting of an operation at the time of authentication failure in step ST30, the enable or disable information that indicates non-destruction is set to the system area 11a of the storage device 10. Then, the power supply is turned off and the operation ends (step ST60). Even after the power supply is turned off, the enable or disable information is not erased and is stored in the system area 11a.

Next, the storage device 10 is connected to the authorized host device 30A by an unauthorized user and the power supply is turned on. Thereby, the storage device 10 executes the apparatus authentication with respect to the host device 30A (step ST10, step ST110, or step ST10'). Since the host device is the authorized host device 30A, the apparatus authentication is succeeded.

Next, the storage device 10 executes the user authentication with respect to the host device 30A (step ST20').

Specifically, the input module 33 of the host device 30A receives an input of invalid second user authentication information, according to the operation from the unauthorized user. The CPU 34 transmits the received invalid second user authentication information to the storage device 10.

The user authentication module 22 of the storage device 10 executes the user authentication, on the basis of the invalid second user authentication information received from the current host device 30A and the first user authentication information in the system area 11a. In this case, the user authentication with respect to the unauthorized user is failed.

When the user authentication is failed, the user authentication module 22 prevents the user data invalidation, on the basis of the enable or disable information in the system area 11a. In the case of a device in which the internal information G (first portion key) in the system area 11a exists, destruction of the internal information G and the third portion key K3 in the SRAM 25 is prevented.

The user authentication module 22 outputs error of the user authentication to the current host device 30A, when the destruction is prevented. At this time, the decryption module 24 is not operated in the case of the configuration example β.

As described above, according to this embodiment, execution or non-execution of the user data invalidation process can be set by the enable or disable information and destruction or non-destruction of the first portion key and the encryption key can be set by the enable or disable information when the storage device has the internal information G (first portion key). Therefore, when destruction is set, the effects of the first to ninth embodiments can be obtained. When non-destruction is set, destruction of the encryption data can be prevented.

Eleventh Embodiment

Next, the eleventh embodiment will be described with reference to FIGS. 1 and 2 described above.

The eleventh embodiment has the configuration where the permitted connection number of times at the time of user authentication failure (retry number of times) is set in the ninth embodiment. In other words, the eleventh embodiment has the configuration using the permitted connection number of times, instead of the enable or disable information in the tenth embodiment.

That is, the system area 11*a* of the storage device 10 stores the permitted connection number of times that indicates new connection number of times permitted until the first portion key and the third portion key are destructed and error number of times that indicates the number of times of failing to execute the user authentication, in addition to the above information.

The user authentication module 22 has a setting function of setting the permitted connection number of times to the system area 11*a*, when a setting request including the permitted connection number of times is received from the authorized host device 30A, in addition to the above-described functions.

The user authentication module 22 has an error number of times updating function of updating the error number of times in the system area 11*a* to increase the error number of times, when the user authentication is failed.

The user authentication module 22 has a destruction preventing function of preventing the user data invalidation process on the basis of the error number of times after the update and the permitted connection number of times in the system area 11*a* (in the case of the configuration example α) and preventing destruction of the first portion key (internal information G) and the third portion key in the cases of the configuration example α1 and the configuration example β.

The user authentication module 22 has an error output function of outputting error of the user authentication to the current host device 30A (or 30B, . . . ) without operating the data read module 27, when the user data invalidation process is prevented.

The user authentication module 22 does not operate the decryption module 24, when the destruction of the first portion key and the third portion key is prevented, in the case of the configuration example β.

Meanwhile, the input module 33 of the host device 30A has a setting request receiving function of receiving an input of the setting request including the enable or disable information, according to the operation from the user, in addition to the above-described functions.

The CPU 34 of the host device 30A has a setting request transmitting function of transmitting the received setting request to the storage device 10, in addition to the above-described functions.

According to the above configuration, when the user authentication is failed, execution or non-execution of the user data invalidation process can be set by the permitted connection number of times and destruction or non-destruction of the first portion key and the third portion key can be set by the permitted connection number of times in the cases of the configuration example α1 and the configuration example β. Therefore, the destruction of the data can be prevented until the connection number of times reaches the permitted connection number of times and the effect of the ninth embodiment can be obtained after the connection number of times reaches the permitted connection number of times.

Twelfth Embodiment

Next, the twelfth embodiment will be described with reference to FIGS. 1 and 2 described above.

The twelfth embodiment has the configuration where destruction log information is stored in the system area 11*a*, when the user authentication module 22 executes the user data invalidation process, that is, destructs the user data and when the user authentication module 22 destructs the first portion key and the third portion key in the cases of the configuration example α1 and the configuration example β, in the first to eleventh embodiments.

Similar to the above case, the destruction log information Lg includes destruction date and time information that indicates a date and time when the user data is destructed and the first portion key and the third portion key are destructed in the cases of the configuration example α1 and the configuration example β and destruction reason information that indicates the failure of the user authentication. The destruction reason information is not limited to the failure of the user authentication and may indicate that the first portion key and the third portion key are destructed according to a valid destruction command.

The user authentication module 22 has a destruction log writing function of generating the destruction log information Lg and writing the destruction log information in the system area 11*a*, when the user data is destructed and the first portion key and the third portion key are destructed in the cases of the configuration example α1 and the configuration example β, in addition to the above-described functions. The destruction log information Lg can be read from the system area 11*a*, according to a read request from the authorized host device 30A.

According to the above configuration, when the user authentication is failed, the user data is destructed, and the internal information G (first portion key) and the third portion key K3 are destructed in the cases of the configuration example α1 and the configuration example β, the user authentication module 22 generates the destruction log information Lg that includes the destruction date and time information indicating a date and time when the user data is destructed and the destruction reason information indicating the failure of the user authentication and writes the destruction log information in the system area 11*a*. Thereby, after the storage device 10 is collected from the theft destination, the destruction log information Lg is read from the system area 11*a*, according to a read request from the authorized host device 30A.

As described above, according to this embodiment, the destruction log information Lg is stored when the user data is destructed and the internal information G (first portion key) and the third portion key K3 are destructed in the cases of the configuration example α1 and the configuration example β. Therefore, in addition to the effects of the first to eleventh embodiments, the authorized user can know the destruction date and time and the destruction reason.

Thirteenth Embodiment

Next, the thirteenth embodiment will be described with reference to FIGS. 1 and 2 described above.

The thirteenth embodiment has the configuration that stores a destruction certificate where a digital signature is given to the destruction log information Lg in the twelfth embodiment.

Specifically, similar to the eighth embodiment, as illustrated in FIG. 25, the system area 11*a* of the storage device 10 previously stores a signature generation key Ksig-10 of the self device, in addition to the above-described information. As illustrated in FIGS. 25 and 26, the system area 11*a* stores the destruction certificate Cert that includes the destruction log information Lg and the digital signature.

The user authentication module 22 has a signature generating function of executing a signing process on the destruction log information Lg in the system area 11*a* on the basis of the signature generation key Ksig-10 in the system area 11*a* and generating a digital signature Sig (Ksig-10, Lg), in addition to the above-described functions.

Further, the user authentication module 22 has a destruction certificate generating function of generating the destruction certificate Cert including the destruction log information Lg and the digital signature Sig (Ksig-10, Lg) and writing the destruction certificate Cert in the system area 11a.

Similar to the above case, the destruction certificate Cert can be read from the system area 11a, according to a read request from the authorized host device 30A.

Meanwhile, the configuration of the host device 30A is the same as that of the eighth embodiment.

According to the above configuration, when the destruction log information Lg is written in the system area 11a in the twelfth embodiment, the user authentication module 22 executes the signing process on the destruction log information Lg in the system area 11a on the basis of the signature generation key Ksig-10 in the system area 11a and generates the digital signature Sig (Ksig-10, Lg).

The user authentication module 22 generates the destruction certificate Cert including the destruction log information Lg and the digital signature Sig (Ksig-10, Lg) and writes the destruction certificate Cert in the system area 11a. Thereby, after the storage device 10 is collected from the theft destination, the destruction certificate Cert is read from the system area 11a, according to a read request from the authorized host device 30A.

The CPU 34 of the authorized host device 30A verifies the read destruction certificate Cert on the basis of the signature verification key Kveri-10 in the memory 32A and outputs the destruction certificate Cert to the output module 35, when the verification result is valid.

As described above, according to this embodiment, the user authentication module 22 stores the destruction certificate Cert where the digital signature is added to the destruction log information Lg, in the system area 11a. Therefore, in addition to the effect of the twelfth embodiment, validity of the destruction log information Lg can be verified.

According to at least one of the embodiments described above, the storage device 10 includes the apparatus authentication module 21 that destructs the user data, destructs the internal information G to be a portion of the authentication information in the case of the configuration example α1, and destructs the first portion key to be a portion of the encryption key in the case of the configuration example β, when the apparatus authentication of the connected host device 30A (or 30B, . . . ) is executed and the apparatus authentication is failed. Therefore, when the storage device is accessed from an environment different from an available system environment, the stored data can be invalidated, regardless of whether a user has access authority.

Fourteenth Embodiment

Next, the fourteenth embodiment will be described with reference to FIGS. 1 and 2 described above.

The fourteenth embodiment relates to a process after both the apparatus authentication and the user authentication are succeeded. In this embodiment, the storage device 10 uses a NAND memory as the nonvolatile semiconductor memory 11 and has a function of executing self destruction, on the basis of a command from the host device, that is, a self destruction command transmitted through the interface device, in a state after both the apparatus authentication and the user authentication are succeeded. A self destruction means is a method that erases all contents in the NAND memory 11.

In this case, a system that can actually destruct the storage contents of the nonvolatile semiconductor memory, such as the second to fifth systems described as the system of the data invalidation process, can be used. In the second to fourth systems, only the block storing the user data becomes the erasure target. However, when the self destruction is executed, data is erased with respect to all of the blocks.

After the self destruction, a code for firmware load called an IPL that is held in the drive control circuit detects error without discovering the firmware and shows non-existence of the firmware through the interface or using a signal of an LED for a notification of a drive access situation, and distinguishment with other failure from the outside can be made.

According to this embodiment, the destruction process can be executed from only the authenticated host device and the authenticated user, and the storage device can be prevented from being destructed by a malicious user. According to necessity, the storage contents can be securely destructed at a high speed and the storage device can be securely destructed. In the case of the HDD, the HDD can be destructed by applying the strong magnetic field to the HDD from the outside. In the storage device using the nonvolatile semiconductor memory, a corresponding method does not exist. However, according to the invention, the storage device using the nonvolatile semiconductor memory can be simply destructed.

Modification of the Embodiments

In the first to thirteenth embodiments, the internal information G (first portion key) in the storage device 10 is combined with the unique information "AA" (second portion key) transmitted from the host device 30A, the generated third portion key is combined with the second user authentication information to generate the encryption key, and the encryption key is stored in the SRAM 25 (volatile memory).

Meanwhile, the first portion key in the system area 11a and the second portion key in the memory 32A may not be used and the encryption key Kg may be previously stored in the memory 32A. When the apparatus authentication is succeeded, the encryption key Kg that is transmitted from the host device 30A may be written in the SRAM 25 by the apparatus authentication module 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a nonvolatile semiconductor memory configured to store user data;
   an apparatus authenticator configured to execute apparatus authentication on the basis of an apparatus authentication information received from a currently connected host device;
   a portion key storage configured to store a first portion key;
   a portion key writer configured to generate a third portion key on the basis of a second portion key received from the currently connected host device and the first portion key stored in the portion key storage, after the apparatus authentication;

a user authenticator configured to execute user authentication on the basis of a user authentication information received from the currently connected host device and the third portion key; and a data read controller configured to output user data stored in the nonvolatile semiconductor memory to the currently connected host device if both of the apparatus authentication and user authentication are passed, wherein the apparatus authenticator destructs the first portion key, if the apparatus authentication is failed.

2. The storage device according to claim 1, further comprising:

an authentication information storage configured to store a first hash value of unique information of an authorized host device, wherein the apparatus authenticator calculates a hash value of the apparatus authentication information as a second hash value, collates the first hash value and the second hash value, and determines that the apparatus authentication is failed, if the first hash value and the second hash value are not matched with each other.

3. The storage device according to claim 1, wherein the apparatus authentication information is unique information of the currently connected host device that is used as the second portion key, and the second portion key is the unique information of the currently connected host device that is used as the apparatus authentication information.

4. The storage device according to claim 1, further comprising:

an authentication information storage configured to store a signature verification key of an authorized host device, wherein the apparatus authentication information includes a digital signature that is generated by a signature generation key of the currently connected host device and signature target data that is used for generation of the digital signature, and the apparatus authenticator decrypts the digital signature on the basis of the signature verification key, collates obtained decryption data and a hash value calculated from the signature target data, and determines that the apparatus authentication is failed, if the decryption data and the hash value are not matched with each other.

5. The storage device according to claim 1, wherein the apparatus authenticator determines that the apparatus authentication is failed, if the apparatus authenticator detects that an authentication sequence of when the currently connected host device transmits the apparatus authentication information is different from a predetermined authentication sequence.

6. The storage device according to claim 1, further comprising:

a user data invalidator configured to execute an invalidation process for physically corrupting the user data stored in the nonvolatile semiconductor memory thereby the user data cannot be read out as its original form, if at least one of the apparatus authentication and user authentication is failed;

an enable or disable information storage configured to store enable or disable information indicating whether the user data is invalidated or not by the user data invalidator;

a setting controller configured to set the enable or disable information to the enable or disable information storage, if a setting request including the enable or disable information is received from the authorized host device;

an invalidation preventor configured to prevent invalidation of the user data on the basis of the enable or disable information in the enable or disable information storage, if the apparatus authentication is failed; and an error output controller configured to output error of the apparatus authentication to the currently connected host device without operating the user authenticator, if the invalidation of the user data is prevented.

7. The storage device according to claim 2, further comprising:

a user data invalidator configured to execute an invalidation process for physically corrupting the user data stored in the nonvolatile semiconductor memory thereby the user data cannot be read out as its original form, if at least one of the apparatus authentication and user authentication is failed;

an enable or disable information storage configured to store enable or disable information indicating whether the user data is invalidated or not by the user data invalidator;

a setting controller configured to set the enable or disable information to the enable or disable information storage, if a setting request including the enable or disable information is received from the authorized host device;

an invalidation preventor configured to prevent invalidation of the user data on the basis of the enable or disable information in the enable or disable information storage, if the apparatus authentication is failed; and an error output controller configured to output error of the apparatus authentication to the currently connected host device without operating the user authenticator, if the invalidation of the user data is prevented.

8. The storage device according to claim 1, further comprising:

a user data invalidator configured to execute an invalidation process for physically corrupting the user data stored in the nonvolatile semiconductor memory thereby the user data cannot be read out as its original form, if at least one of the apparatus authentication and user authentication is failed;

a destruction preventor configured to prevent destruction of the first portion key, when the invalidation of the user data is prevented, on the basis of the enable or disable information in the enable or disable information storage, wherein the error controller configured to output error of the apparatus authentication to the currently connected host device without operating the portion key writer and the user authenticator, if the destruction of the first portion key is prevented.

9. The storage device according to claim 1, further comprising:

a user data invalidator configured to execute an invalidation process for physically corrupting the user data stored in the nonvolatile semiconductor memory thereby the user data cannot be read out as its original form, if at least one of the apparatus authentication and user authentication is failed;

a permitted connection count storage configured to store a permitted connection count indicating the number of times of requesting connection establishment permitted until the first portion key is destructed;

an error count storage configured to store an error count indicating the number of times of failing to execute the apparatus authentication;

a setting controller configured to set the permitted connection count to the permitted connection count storage, if a setting request including the permitted connection count is received from the authorized host device;

an error count updater configured to increment the error count stored in the error count storage, if the apparatus authentication is failed;

an invalidation preventor configured to prevent invalidation of the user data on the basis of the updated error count and the permitted connection count; and an error output controller configured to output error of the apparatus authentication to the currently connected host device without operating the user authenticator, if the invalidation of the user data is prevented.

10. The storage device according to claim 1, further comprising:

a user data invalidator configured to execute an invalidation process for physically corrupting the user data stored in the nonvolatile semiconductor memory thereby the user data cannot be read out as its original form, if at least one of the apparatus authentication and user authentication is failed;

a destruction log storage configured to store destruction log information including destruction date and time information indicating a date and time when an invalidation process of the user data is executed and destruction reason information indicating a failure of the apparatus authentication; and a destruction log writer configured to generate the destruction log information and write the destruction log information in the destruction log storage, if the invalidation process of the user data is executed.

* * * * *